United States Patent [19]
Usui et al.

[11] Patent Number: 5,940,580
[45] Date of Patent: Aug. 17, 1999

[54] METHOD AND APPARATUS FOR SIMULATING COLOR PRINT

[75] Inventors: Nobuaki Usui, Tokyo; Atsushi Imamura, Kyoto, both of Japan

[73] Assignee: Dainippon Screen Mfg. Co., Ltd., Japan

[21] Appl. No.: 08/887,495

[22] Filed: Jul. 2, 1997

[30] Foreign Application Priority Data

Jul. 2, 1996 [JP] Japan .................................. 8-192825

[51] Int. Cl.⁶ .................................................. G06F 15/00
[52] U.S. Cl. .......................... 395/109; 358/518; 358/525
[58] Field of Search .................................. 395/109, 101;
358/509, 511, 512, 518, 520, 525, 519,
527, 531, 500, 501, 504, 510, 515, 516,
517, 530, 502, 503, 475, 448, 443, 400,
401, 480; 382/162, 164, 167; 345/431,
153, 150, 199, 426, 429, 147; 348/191;
355/22, 32, 35, 38, 67; 356/402, 406, 407,
405, 425, 408, 300, 319, 326, 328, 302,
303, 409, 414; 396/330

[56] References Cited

U.S. PATENT DOCUMENTS

| | | | |
|---|---|---|---|
| 4,905,039 | 2/1990 | Terashita | 355/35 |
| 5,272,518 | 12/1993 | Vincent | 356/405 |
| 5,408,447 | 4/1995 | Cottrell et al. | 358/518 |
| 5,485,556 | 1/1996 | Takagi et al. | 345/426 |
| 5,596,425 | 1/1997 | Usui et al. | 358/500 |

FOREIGN PATENT DOCUMENTS 669754  8/1995  European Pat. Off. .

OTHER PUBLICATIONS

Balasubramanian, R., "Colormetric Modeling of Binary Color Printers", Proceedings of the International Conference on Image Processing (ICIP), Washington, Oct. 23–26, 1995, vol. 2, Oct. 23, 1995, Institute of Electrical and Electronics Engineers, pp. 327–330.

*Primary Examiner*—Dov Popovici
*Attorney, Agent, or Firm*—Ostrolenk, Faber, Gerb & Soffen, LLP

[57] ABSTRACT

An N-dimensional correction space is constructed with weighting coefficients $\xi$ and $\eta$ that are used for determining reflection coefficients for an N-order target color, where the weighting coefficients $\xi$ and $\eta$ specify the lengths of the sides constituting the N-dimensional correction space, and where $2^N$ reference colors are located at the corners of the N-dimensional correction space. The N-dimensional correction space is divided by N pieces of (N−1)-dimensional spaces that run through the target color, into $2^N$ partial N-order correction spaces. The reflection coefficient for the target color is determined by multiplying a reference reflection coefficient with respect to each of the $2^N$ reference colors by the volume of a partial N-dimensional correction space that is located at a diagonal position against a coordinate point of each reference color and summing up the results of multiplication for the $2^N$ reference colors.

7 Claims, 20 Drawing Sheets

Fig. 3 (A) PRIMARY COLOR
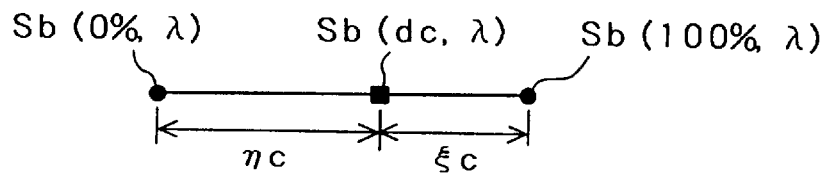
Fig. 3 (B) SECONDARY COLOR
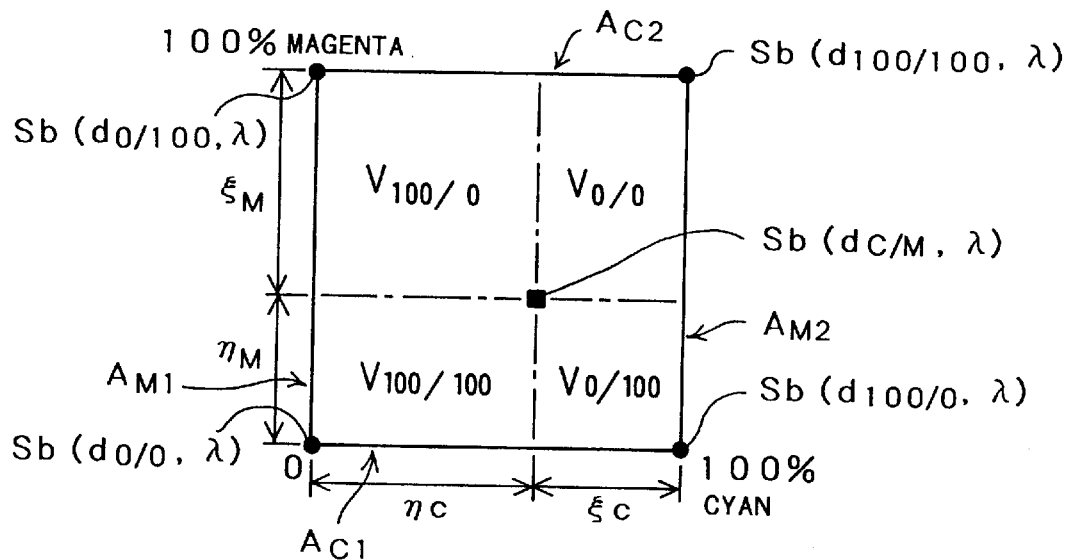
Fig. 3 (C) TERTIARY COLOR
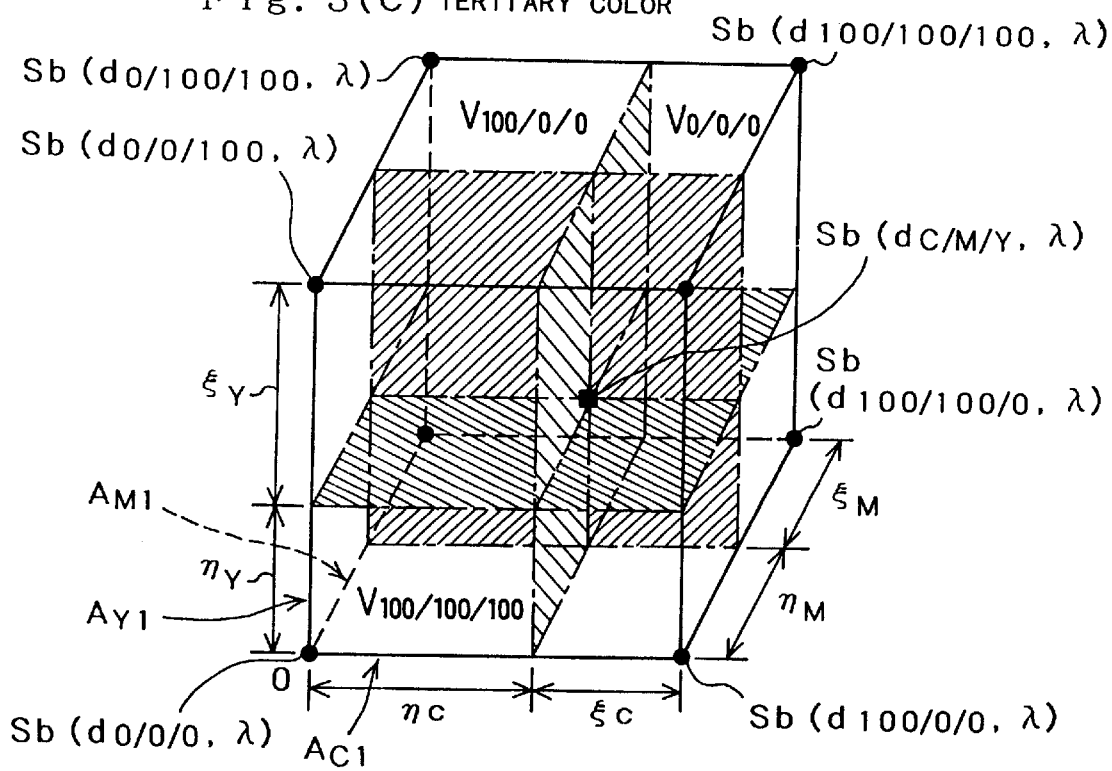

Fig. 4 (A) COORDINATE SYSTEM OF DOT PERCENT
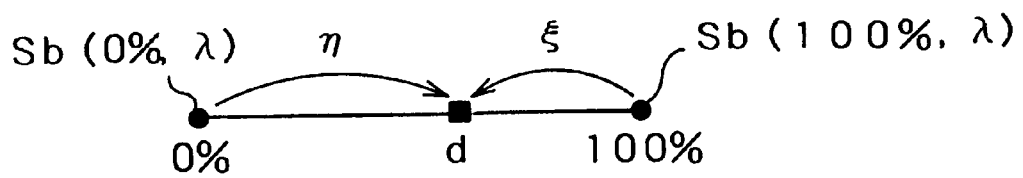
Fig. 4 (B)
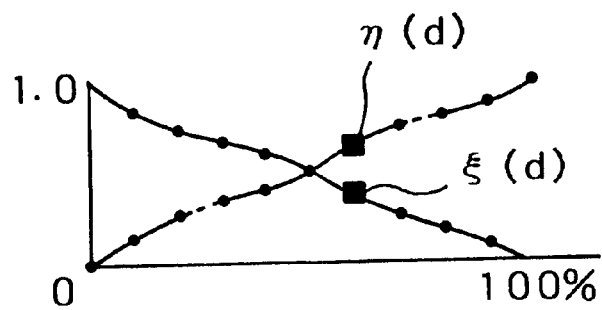
Fig. 4 (C) CORRECTION COORDINATE SYSTEM
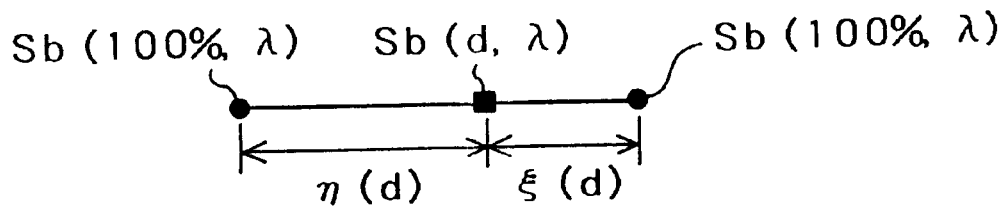

Fig. 7 (A) GRADATION (11 COLOR CHIPS)

| 0 % | 10 | 20 | 30 | 40 | 50 | 60 | 70 | 80 | 90 | 100 % |
|---|---|---|---|---|---|---|---|---|---|---|

Fig. 7 (B) MEASUREMENT CONDITIONS OF SPECTRAL REFLECTIVITY (FOR EACH COLOR CHIP)

| θ \ ρ | -10° | -8° | -2° | 0° | 2° | 34° | 35° |
|---|---|---|---|---|---|---|---|
| 8° | ○ | ○ | ○ | ○ | ○ | ○ | ○ |
| 10° | ○ | ○ | ○ | ○ | ○ | ○ | ○ |

Fig. 7 (C) MEASUREMENT OF SPECTRAL REFLECTIVITY (UNDER EACH CONDITION)

SPECTRAL REFLECTIVITY (Fig. 9)

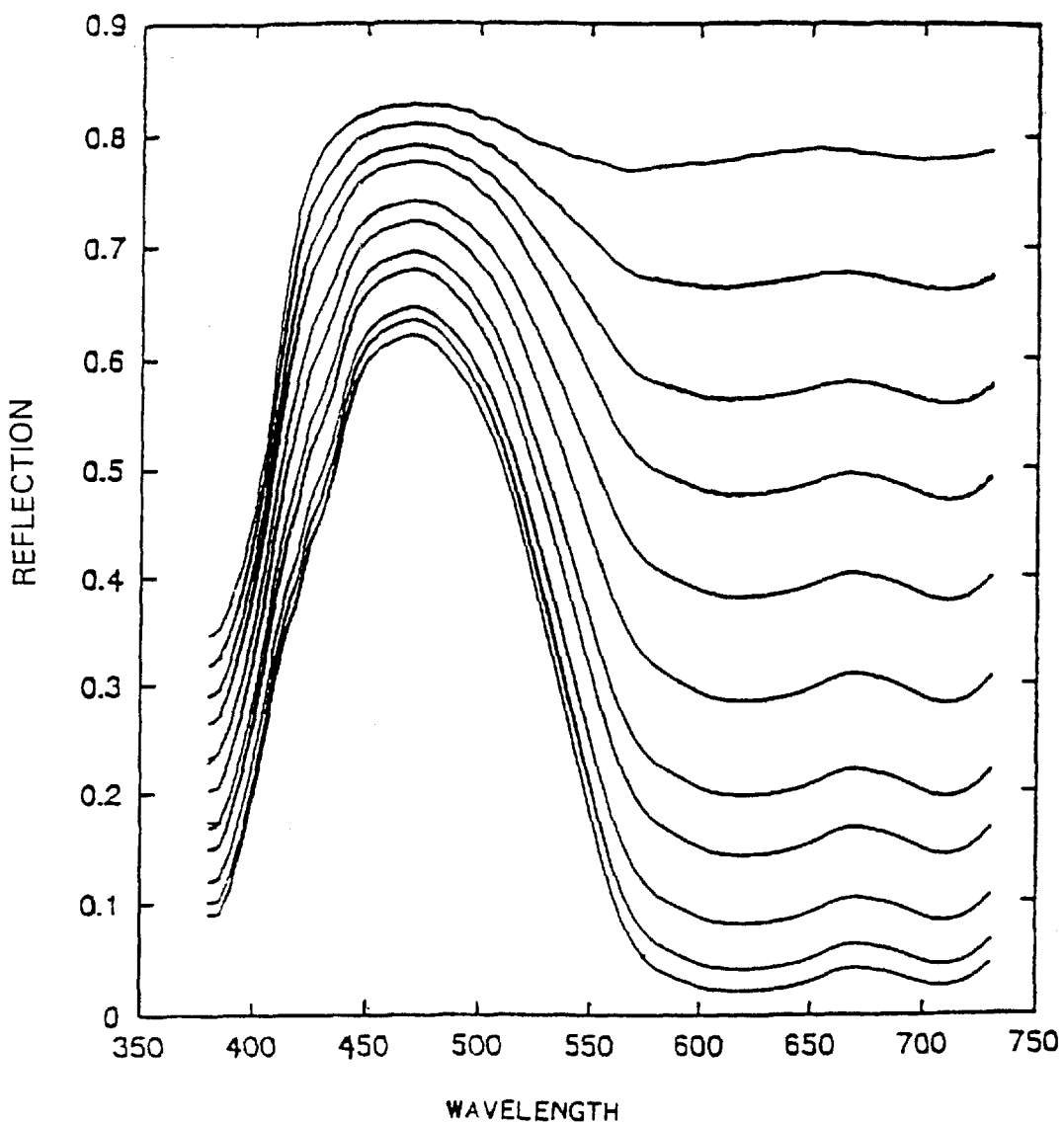
Fig. 10(B) DIFFUSE REFLECTION COMPONENT (Fig. 11)

Fig. 10(C)
SPECULAR REFLECTION
COMPONENT (Fig. 12)
((A) - (B))
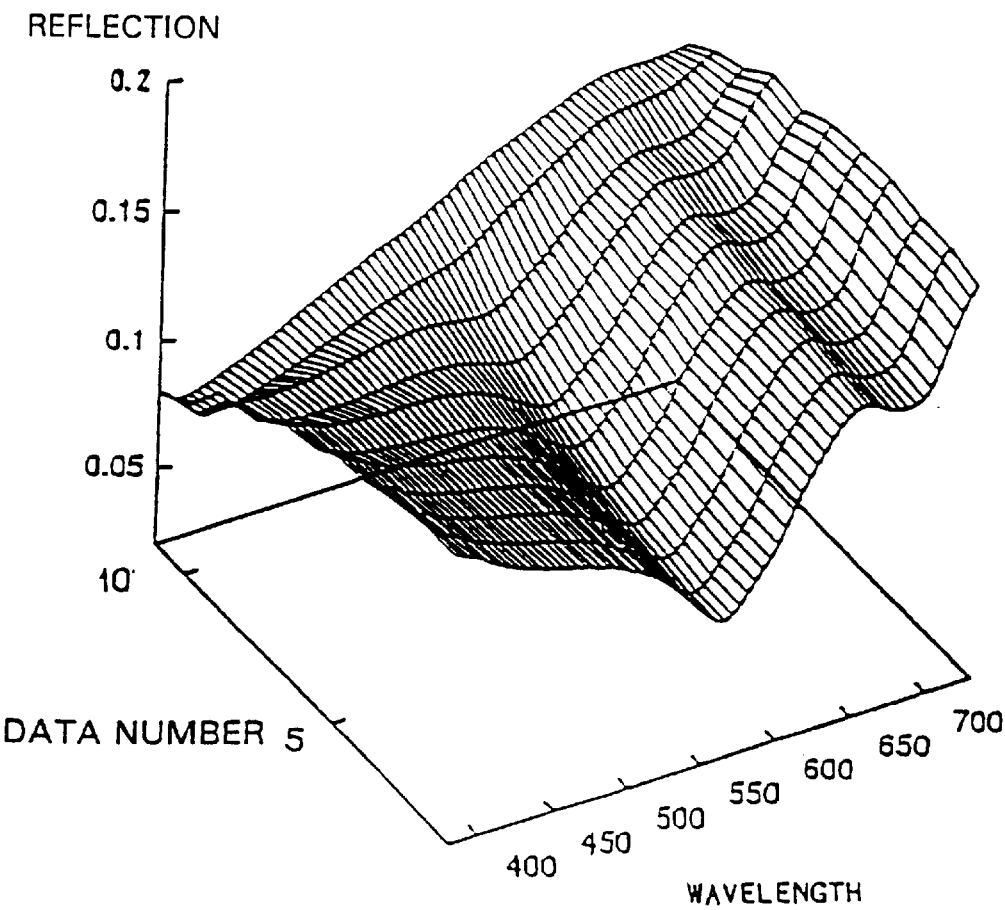
Fig. 10(D) WEIGHTING COEFFICIENTS
(Fig. 4(B))
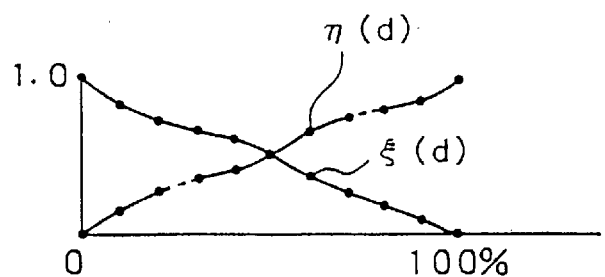

ESTIMATION OF SPECULAR REFLECTION COMPONENT Ss(d, λ)

COMPARISON BETWEEN MEASURED VALUES OF
DIFFUSE REFLECTION COMPONENT $Sb(d,\lambda)\cos\theta$ (SOLID LINES)
AND RESULTS OF SIMULATION (BROKEN LINES)

COORDINATE SYSTEM OF DOT PERCENT

CORRECTION COORDINATE SYSTEM

METHOD AND APPARATUS FOR SIMULATING COLOR PRINT

BACKGROUND OF THE INVENTION

1. Field of the Invention

The present invention relates to a technique of reproducing color prints with an output device, such as a display device or a printer.

2. Description of the Related Art

In reproducing a color print with a variety of output devices including a display device and a printer, it is desirable to reproduce colors closest possible to those of the actual color print. The conventional method of reproducing colors of a print utilizes a known equation, such as Marley-Davis's Equation, Jule-Nielsen's Equation, or Neugebauer's Equation. For example, Neugebauer's Equation is used to calculate the values of color components R, G, and B from the dot percents of four color inks Y, M, C, and K.

The known conversion equations are, however, based on an ideal model and can not reproduce the actual colors in many cases. Especially, no model is applicable for simulating observation of a print arranged in a three-dimensional space.

The applicant of the present invention has proposed a method of reproducing a print arranged in a three-dimensional space, as disclosed in U.S. Pat. No. 5,596,425. This proposed method determines an illuminance spectrum $I(\theta, \rho, \lambda)$ of reflected light from a color print according to a specular reflection coefficient $Ss(\lambda)$ and an internal reflection coefficient $Sb(\lambda)$, and displays the color print based on the illuminance spectrum $I(\theta, \rho, \lambda)$, where $\theta$ denotes an angle of reflection, $\rho$ denotes an angle of deviation, and $\lambda$ denotes a wavelength. This method can faithfully reproduce a print having a specific dot percent, such as 100%, of a single primary color, but its applicability was not clear to the faithful reproduction of a color print having an arbitrary dot percent or a color print that is printed in a plurality of inks.

SUMMARY OF THE INVENTION

Accordingly, an object of the present invention is to provide a technique for reproducing an image portion having an arbitrary dot percent included in a color print, which is printed in a plurality of inks and arranged in a three-dimensional space, with a higher accuracy.

In order to attain at least partly the above and other objects of the present invention, there is provided a method of simulating a color print of an N-order color, where N is an integer of at least 2, arranged in three-dimensional space by rendering the color print and thereby reproducing the color print with an output device. The method uses an illuminance spectrum $I(d_{1-N},\theta,\rho,\lambda)$ of a reflected light beam, which is observed at a predetermined observation point when a target point having a target N-order color on the color print is irradiated with light having a predetermined luminance spectrum $\phi(\lambda)$. The illuminance spectrum $I(d_{1-N},\theta,\rho,\lambda)$ is given by the following Equation:

$$I(d_{1-N},\theta,\rho,\lambda) = \{Sb(d_{1-N},\lambda) \cdot fb(\theta) + Ss(d_{1-N},\lambda) \cdot fs(\rho)\} \cdot \phi(\lambda) + Ie(\lambda)$$

wherein $d_{1-N}$ denotes a dot percent of each of N different color inks at the target point, $\lambda$ denotes a wavelength of light, $Sb(d_{1-N},\lambda)$ and $Ss(d_{1-N},\lambda)$ respectively represent a first reflection coefficient and a second reflection coefficient for the N-order color, $\theta$ denotes an angle of reflection, $fb(\theta)$ denotes a $\theta$-dependent characteristic, $\rho$ denotes an angle of deviation of an observing direction from a reflecting direction of the light beam, $fs(\rho)$ denotes a $\rho$-dependent characteristic, and $Ie(\lambda)$ represents an illuminance spectrum of ambient light observed at the observation point. The method comprises the steps of: (a) determining a first reference value of the first reflection coefficient Sb and a second reference value of the second reflection coefficient Ss as a first reference reflection coefficient and a second reference reflection coefficient with respect to each of $2^N$ reference colors, the $2^N$ reference colors being located at both ends of $N \times 2^{(N-1)}$ sides that constitute an N-dimensional color space including the target N-order color, the first and second reference reflection coefficients for the each of $2^N$ reference colors being used to determine the illuminance spectrum $I(d_{1-N},\theta,\rho,\lambda)$ of the each of $2^N$ reference colors according to the Equation; (b) specifying, with respect to each side of the N-dimensional color space, two weighting coefficients for two reference colors located at both ends of the each side, the two weighting coefficients being usable in determining a color on the each side by interpolating the two reference colors at the both ends; (c) constructing an N-dimensional correction space corresponding the N-dimensional color space, each side of the N-dimensional correction space having a length equal to a sum of the weighting coefficients for a corresponding side of the N-dimensional color space; allocating the reference colors at both ends of each side of the N-dimensional color space to both ends of a corresponding side of the N-dimensional correction space; and dividing the N-dimensional correction space by N pieces of (N−1)-order spaces into $2^N$ partial N-dimensional correction spaces, the N pieces of (N−1)-order spaces running through the target N-order color; (d) multiplying the first reference reflection coefficient with respect to each of the $2^N$ reference colors by a volume of a partial N-dimensional correction space which is at a diagonal position against a point of the each reference color in the N-dimensional correction space, and summing up the results of multiplication for the $2^N$ reference colors, to thereby determine the first reflection coefficient Sb for the target color; (e) multiplying the second reference reflection coefficient with respect to each of the $2^N$ reference colors by a volume of a partial N-dimensional correction space which is at a diagonal position against a point of the each reference color in the N-dimensional correction space, and summing up the results of multiplication for the $2^N$ reference colors, to thereby determine the second reflection coefficient Ss for the target N-order color; (f) determining the illuminance spectrum I of the reflected light beam according to the Equation with the first reflection coefficient Sb and the second reflection coefficient Ss determined in the steps (d) and (e); and (g) obtaining color data representing the target color in a colorimetric system suitable for the output device based on the illuminance spectrum I of the reflected light beam.

The 'volume of the partial N-dimensional correction space' is given by an integral of the partial N-dimensional correction space. For example, the 'volume' of the 'partial three-dimensional correction space', which is a three-dimensional solid, is a volume in the narrow sense. The 'volume' of the 'partial two-dimensional correction space', which is a two-dimensional plane, is an area.

The above method can readily determine the illuminance spectrum $I(d_{1-N},\theta,\rho,\lambda)$ for the N-order target color having an arbitrary dot percent $d_{1-N}$, and convert the illuminance spectrum to color data in the colorimetric system of the output device. This accordingly enables an image portion of an arbitrary dot percent included in a color print of the N-order color arranged in a three-dimensional space to be reproduced with a higher accuracy on the display device.

In a preferred embodiment, the N-order correction space has N pieces of axes starting from an origin of the N-order correction space, the N pieces of axes being perpendicular to each other, and wherein each of the N pieces of (N−1)-order spaces is perpendicular to one of the N pieces of axes.

Preferably, the characteristics $fb(\theta)$ and $fs(\rho)$ are given by:

$$fb(\theta) = \cos\theta$$

$$fs(\rho) = e^{-\sigma\rho^2}$$

where $\sigma$ is a constant.

According to an aspect of the present invention, there is provided an apparatus for simulating a color print of an N-order color, where N is an integer of at least 2, arranged in a three-dimensional space by rendering the color print and thereby reproducing the color print with an output device. The apparatus uses an illuminance spectrum $I(d_{1-N},\theta,\rho,\lambda)$ given by the above stated Equation. The apparatus comprises: reference reflection coefficient determining means for determining a first reference value of the first reflection coefficient Sb and a second reference value of the second reflection coefficient Ss as a first reference reflection coefficient and a second reference reflection coefficient with respect to each of $2^N$ reference colors, the $2^N$ reference colors being located at both ends of $N \times 2^{(N-1)}$ sides that constitute an N-dimensional color space including the target N-order color, the first and second reference reflection coefficients for the each of $2^N$ reference colors being used to determine the illuminance spectrum $I(d_{1-N},\theta,\rho,\lambda)$ of the each of $2^N$ reference colors according to the Equation; means for specifying, with respect to each side of the N-dimensional color space, two weighting coefficients for two reference colors located at both ends of the each side, the two weighting coefficients being usable in determining a color on the each side by interpolating the two reference colors at the both ends; means for constructing an N-dimensional correction space corresponding the N-dimensional color space, each side of the N-dimensional correction space having a length equal to a sum of the weighting coefficients for a corresponding side of the N-dimensional color space; allocating the reference colors at both ends of each side of the N-dimensional color space to both ends of a corresponding side of the N-dimensional correction space; and dividing the N-dimensional correction space by N pieces of (N−1)-order spaces into $2^N$ partial N-dimensional correction spaces, the N pieces of (N−1)-order spaces running through the target N-order color; first reflection coefficient determining means for multiplying the first reference reflection coefficient with respect to each of the $2^N$ reference colors by a volume of a partial N-dimensional correction space which is at a diagonal position against a point of the each reference color in the N-dimensional correction space, and summing up the results of multiplication for the $2^N$ reference colors, to thereby determine the first reflection coefficient Sb for the target color; second reflection coefficient determining means for multiplying the second reference reflection coefficient with respect to each of the $2^N$ reference colors by a volume of a partial N-dimensional correction space which is at a diagonal position against a point of the each reference color in the N-dimensional correction space, and summing up the results of multiplication for the $2^N$ reference colors, to thereby determine the second reflection coefficient Ss for the target N-order color; illuminance spectrum determining means for determining the illuminance spectrum I of the reflected light beam according to the Equation with the first reflection coefficient Sb and the second reflection coefficient Ss determined by the first and second reflection coefficient determining means; and means for obtaining color data representing the target color in a colorimetric system suitable for the output device based on the illuminance spectrum I of the reflected light beam.

According to another aspect of the present invention, there is provided a computer program product for simulating a color print of an N-order color, where N is an integer of at least 2, arranged in a three-dimensional space by rendering the color print and thereby reproducing the color print with an output device. The computer program product comprises: a computer readable medium; and a computer program code means stored on the computer readable medium. The computer program code means comprises: first program code means using an illuminance spectrum $I(d_{1-N},\theta,\rho,\lambda)$ given by the above Equation. The first program code means causes a computer to determine a first reference value of the first reflection coefficient Sb and a second reference value of the second reflection coefficient Ss as a first reference reflection coefficient and a second reference reflection coefficient with respect to each of $2^N$ reference colors, the $2^N$ reference colors being located at both ends of $N \times 2^{(N-1)}$ sides that constitute an N-dimensional color space including the target N-order color, the first and second reference reflection coefficients for the each of $2^N$ reference colors being used to determine the illuminance spectrum $I(d_{1-N},\theta,\rho,\lambda)$ of the each of $2^N$ reference colors according to the Equation. The computer program code means further comprises: second program code means causing the computer to specify, with respect to each side of the N-dimensional color space, two weighting coefficients for two reference colors located at both ends of the each side, the two weighting coefficients being usable in determining a color on the each side by interpolating the two reference colors at the both ends; third program code means causing the computer to construct an N-dimensional correction space corresponding the N-dimensional color space, each side of the N-dimensional correction space having a length equal to a sum of the weighting coefficients for a corresponding side of the N-dimensional color space; allocating the reference colors at both ends of each side of the N-dimensional color space to both ends of a corresponding side of the N-dimensional correction space; and dividing the N-dimensional correction space by N pieces of (N−1)-order spaces into $2^N$ partial N-dimensional correction spaces, the N pieces of (N−1)-order spaces running through the target N-order color; fourth program code means causing the computer to multiply the first reference reflection coefficient with respect to each of the $2^N$ reference colors by a volume of a partial N-dimensional correction space which is at a diagonal position against a point of the each reference color in the N-dimensional correction space, and to sum up the results of multiplication for the $2^N$ reference colors, to thereby determine the first reflection coefficient Sb for the target color; fifth program code means causing the computer to multiply the second reference reflection coefficient with respect to each of the $2^N$ reference colors by a volume of a partial N-dimensional correction space which is at a diagonal position against a point of the each reference color in the N-dimensional correction space, and summing up the results of multiplication for the $2^N$ reference colors, to thereby determine the second reflection coefficient Ss for the target N-order color; sixth program code means causing the computer to determine the illuminance spectrum I of the reflected light beam according to the Equation with the first reflection coefficient Sb and the second reflection coefficient Ss determined by the first and fourth and fifth program code means; and seventh program code means causing the computer to obtain color data representing the target color in a calorimetric system suitable for the output device based on the illuminance spectrum I of the reflected light beam.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A)–3(C) show a process of determining reflection coefficients for the primary color, the secondary color, and the tertiary color;

FIGS. 4(A)–4(C) show a method of determining a diffuse reflection coefficient Sb(d,λ) for the primary color;

DESCRIPTION OF THE PREFERRED EMBODIMENT

A. Outline of the Process of Creating Color Data

Figure 1:
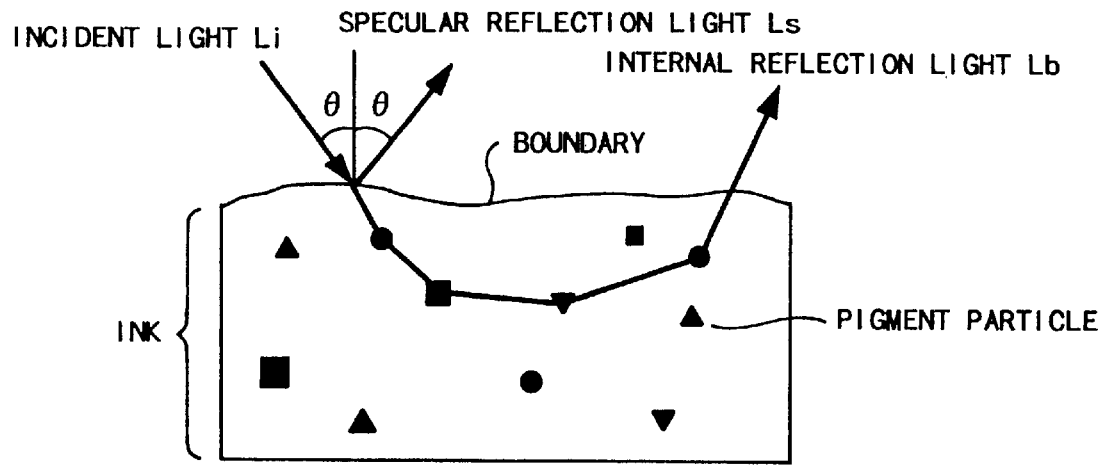
FIG. 1 illustrates a process of reflecting an incident light beam from an ink applied on a printing sheet.

FIG. 1 illustrates a process of reflecting incident light from an ink applied on a printing sheet. Referring to FIG. 1, an incident light beam Li applied to an ink is reflected by two different pathways. A first reflected light beam is a specular reflection light beam Ls reflected from a boundary between the surface of the ink and an air layer. A second reflected light beam is a diffuse reflected light beam Lb (also referred to as 'internal reflection light beam'), which passes through the surface of the ink, scattered by the ink and particles in the sheet, and eventually goes outside.

Figure 2:
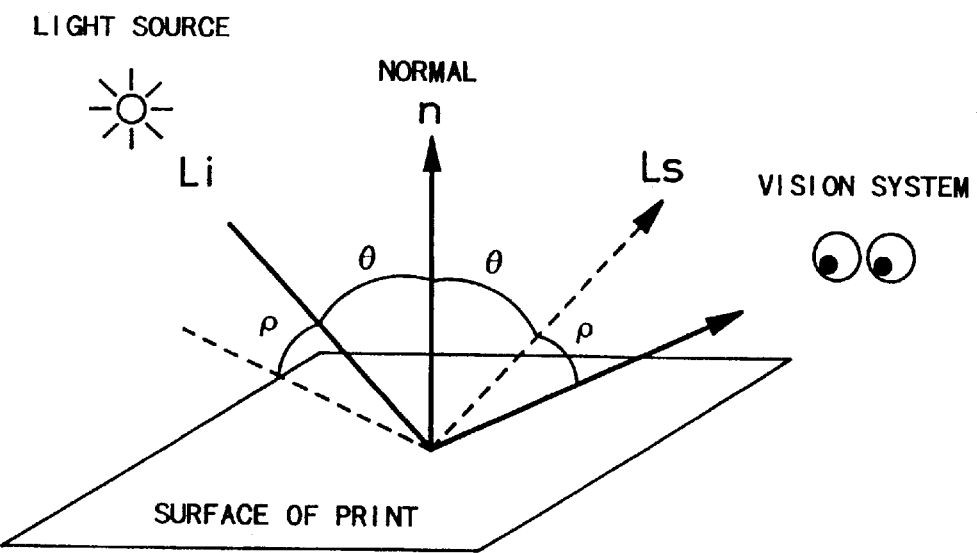
FIG. 2 shows the relationship between a light source, a print, and a visual system.

FIG. 2 shows the relationship between a light source, a print, and a vision system (observer). Referring to FIG. 2, the position of the vision system is generally deviated from the direction of the specular reflection light beam Ls by an angle ρ (hereinafter referred to as the angle of deviation). The direction from a reflection point of the light beam on the surface of the print toward the vision system (that is, the direction of observation) may not exist on a specific plane including the incident light beam Li and the specular reflection light beam Ls. Even in this case, the angle of the specular reflection light beam Ls and the direction of observation is defined by the angle of deviation ρ.

In the drawing of FIG. 2, the illuminance of the reflected light observed by the observer can be expressed as a linear combination of the illuminance of the specular reflection light beam Ls, the illuminance of the diffuse reflected light beam Lb, and the illuminance of ambient light, by the following Equation (1):

$$I(\theta,\rho,\lambda)=Ib(\theta,\rho,\lambda)+Is(\theta,\rho,\lambda)+Ie(\lambda) \qquad (1)$$

wherein λ denotes a wavelength of a light beam, $I(\theta,\rho,\lambda)$ denotes an illuminance spectrum of a reflected light beam observed, $Ib(\theta,\rho,\lambda)$ denotes an illuminance spectrum of the diffuse reflected light beam Lb, $Is(\theta,\rho,\lambda)$ denotes an illuminance spectrum of the specular reflection light beam, and $Ie(\lambda)$ denotes an illuminance spectrum of ambient light. The illuminance spectra $I(\theta,\rho,\lambda)$, $Is(\theta,\rho,\lambda)$, and $Tb(\theta,\rho,\lambda)$ depend upon an angle of reflection θ, the angle of deviation ρ, and the wavelength λ. The illuminance spectrum $Ie(\lambda)$ of ambient light is an element attributable to the ambient light observed at an observation point and including light from a standard light source and natural light. The illuminance spectrum $Ie(\lambda)$ of ambient light does not depend upon the angle of reflection θ or the angle of deviation ρ, but depends upon only the wavelength λ.

Assuming that the illuminance spectra $Is(\theta,\rho,\lambda)$, and $Ib(\theta,\rho,\lambda)$ included in Equation (1) are respectively divided into an angular element and a wavelength element as defined by Equations (2a) and (2b) given below, Equation (1) can be rewritten as Equation (3):

$$Ib(\theta,\lambda)=Sb(\lambda)\cdot fb(\theta)\cdot \phi(\lambda) \qquad (2a)$$

$$Is(\rho,\lambda)=Ss(\lambda)\cdot fs(\rho)\cdot \phi(\lambda) \qquad (2b)$$

$$I(\theta,\rho,\lambda)=\{Sb(\lambda)\cdot fb(\theta)+Ss(\lambda)\cdot fs(\rho)\}\cdot \phi(\lambda)+Ie(\lambda) \qquad (3)$$

wherein $Sb(\lambda)$ denotes a diffuse reflection coefficient, $Ss(\lambda)$ denotes a specular reflection coefficient, and $\phi(\lambda)$ denotes a luminance spectrum of the incident light beam.

As is known, an angle-dependent characteristic $fb(\theta)$ of the diffuse reflected light beam Lb is expressed by cos θ. The illuminance of the specular reflection light beam Ls reaches its maximum on observation in the reflecting direction along the angle of reflection θ (that is, the direction of θ=0°, and abruptly decreases with a deviation from the reflecting direction. A characteristic fs(ρ) included in Equation (3) represents this phenomenon. It is accordingly thought that the function fs(ρ) represents the characteristic that is equal to one when ρ=0 and abruptly decreases in a monotonic manner with an increase in ρ in the range of $0 \leq \rho \leq 90°$. As is known, for example, the $n_0$-th power of cos θ ($n_0$ is a constant experimentally determined) may be used as the characteristic fs(ρ). In this embodiment, however, the functional form of the characteristic fs(ρ) is determined based on the measurement of reflected light as discussed below.

Equation (3) given above does not take into account the dot percents of the color print. In the description below, it is assumed that the color print is printed in four primary color inks, C (cyan), M (magenta), Y (yellow), and K (black) and that the dot percents of the four color inks are defined as $(d_C, d_M, d_Y, d_K)$. The symbol '$d_{C/M/Y/K}$' in the following description represents the dot percents of the four color inks, C, M, Y, and K. In the right-hand side of Equation (3), only the diffuse reflection coefficient Sb and the specular reflection coefficient Ss depend upon the dot percents $d_{C/M/Y/K}$. Equation (3) is accordingly rewritten as Equation (4) given below:

$$I(d_{C/M/Y/K}, \theta, \rho, \lambda) = \{Sb(d_{C/M/Y/K}, \lambda) \cdot \cos\theta + Ss(d_{C/M/Y/K}, \lambda) \cdot fs(\rho)\} \cdot \phi(\lambda) + Ie(\lambda) \quad (4)$$

When an illuminance spectrum $I(d_{C/M/Y/K}, \theta, \rho, \lambda)$ of the reflected light is obtained for a printed area having the dot percents of $d_{C/M/Y/K}$, three stimulus values $X(d_{C/M/Y/K})$, $Y(d_{C/M/Y/K})$, and $Z(d_{C/M/Y/K})$ in the CIE-XYZ calorimetric system are defined by Equations (5a)–(5c) given below according to the definition:

$$X(d_{C/M/Y/K}) = k \int_{380}^{720} I(d_{C/M/Y/K}, \theta, \rho, \lambda) \cdot \bar{x}(\lambda) d\lambda \quad (5a)$$

$$Y(d_{C/M/Y/K}) = k \int_{380}^{720} I(d_{C/M/Y/K}, \theta, \rho, \lambda) \cdot \bar{y}(\lambda) d\lambda \quad (5b)$$

$$Z(d_{C/M/Y/K}) = k \int_{380}^{720} I(d_{C/M/Y/K}, \theta, \rho, \lambda) \cdot \bar{z}(\lambda) d\lambda \quad (5c)$$

wherein x(λ), y(λ), and z(λ) denote isochromatic functions. As a matter of convenience, bars above the letters x, y, and z are omitted in the text except Equations.

Conversion of the three stimulus values $X(d_{C/M/Y/K})$, $Y(d_{C/M/Y/K})$, and $Z(d_{C/M/Y/K})$ obtained according to Equations (5a)–(5c) or chromaticity coordinates thereof (x,y,z) into color data in a colorimetric system of the output device (for example, RGB colorimetric system) enables colors of the printed area having the dot percents of $d_{C/M/Y/K}$ to be faithfully reproduced by the output device.

Equation (4) given above is readily expandable to general prints in N different color inks. In this specification, the symbol '$d_{1-N}$' denotes dot percents of N different color inks. General Equation (6) is obtained by replacing the symbol $d_{C/M/Y/K}$ in Equation (4) by the symbol $d_{1-N}$:

$$I(d_{1-N}, \theta, \rho, \lambda) = \{Sb(d_{1-N}, \lambda) \cdot fb(\theta) + Ss(d_{1-N}, \lambda) \pi fs(\rho)\} \cdot \phi(\lambda) + Ie(\lambda) \quad (6)$$

The following description primarily refers to the case in which Equation (4) is applied (that is, the case in which a print in four color inks C, Y, M, and K is reproduced). In the specification, a color reproduced with N different color inks is referred to as 'N-order color'.

The illuminance spectrum Ie(λ) of the ambient light, which is the third term in the right-hand side of Equation (4), is set to a fixed value according to the observation environment of the color print. Determination of the terms other than the illuminance spectrum Ie(λ) of the ambient light in Equation (4) will give the illuminance spectrum I of the reflected light in an arbitrary observation environment. The following describes a process of determining the illuminance spectrum I of the reflected light when the illuminance spectrum Ie(λ) of the ambient light is equal to zero.

Upon condition that the illuminance spectrum Ie(λ) of the ambient light is equal to zero, Equation (4) is rewritten as Equation (7) given below:

$$I(d_{C/M/Y/K}, \theta, \rho, \lambda) = Ib(d_{C/M/Y/K}, \theta, \lambda) + Is(d_{C/M/Y/K}, \rho, \lambda) = \{Sb(d_{C/M/Y/K}, \lambda) \cdot \cos\theta + Ss(d_{C/M/Y/K}, \lambda) \cdot fs(\rho)\} \cdot \phi(\lambda) \quad (7)$$

What is to be known here is the diffuse reflection coefficient $Sb(d_{C/M/Y/K}, \lambda)$ and the specular reflection coefficient $Ss(d_{C/M/Y/K}, \lambda)$ at the dot percent $d_{C/M/Y/K}$ and a concrete form of the characteristic fs(ρ) depending upon the angle of deviation ρ. Determination of the form of the characteristic fs(ρ) will be discussed later. The following refers to the outline of the process of determining the diffuse reflection coefficient $Sb(d_{C/M/Y/K}, \lambda)$ and the specular reflection coefficient $Ss(d_{C/M/Y/K}, \lambda)$ at the dot percent $d_{C/M/Y/K}$.

B. Outline of the Process of Determining Reflection Coefficients for the N-order Color FIGS. 3(A)–3(C) show a process of determining reflection coefficients for the primary color, the secondary color, and the tertiary color. FIG. 3(A) shows a process of determining the reflection coefficients for the primary color. By way of example, the diffuse reflection coefficient $Sb(d_C, \lambda)$ for the primary color of cyan is determined according to Equation (8) given below:

$$Sb(d_C, \lambda) = \xi_C(d_C) \cdot Sb(d_C=0\%, \lambda) + \eta_C(d_C) \cdot Sb(d_C=100\%, \lambda) \quad (8)$$

$$0 \leq d_C \leq 100\%$$

wherein $\xi_C(d_C)$ and $\eta_C(d_C)$ denote weighting coefficients. The diffuse reflection coefficient $Sb(d_C, \lambda)$ at an arbitrary dot percent $d_C$ of cyan is expressed as a linear combination of diffuse reflection coefficients $Sb(d_C=0\%, \lambda)$ and $Sb(d_C=100\%, \lambda)$ at two reference dot percents ($d_C=0\%, 100\%$). A concrete procedure of determining the weighting coefficients $\xi_C(d_C)$ and $\eta_C(d_C)$ and the reference reflection coefficients $Sb(d_C=0\%, \lambda)$ and $Sb(d_C=100\%, \lambda)$ will be discussed later.

The specular reflection coefficient $Ss(d_C, \lambda)$ at an arbitrary dot percent $d_C$ of cyan is defined by Equation (9), which is similar to Equation (8):

$$Ss(d_C, \lambda) = \xi_C(d_C) \cdot Ss(d_C=0\%, \lambda) + \eta_C(d_C) \cdot Sb(d_C=100\%, \lambda) \quad (9)$$

$$0 \leq d_C \leq 100\%$$

The weighting coefficients $\xi_C$ and $\eta_C$ in Equation (9) may be identical with those in Equation (8). Alternatively the weighting coefficients for the diffuse reflection coefficients $Sb(d_C, \lambda)$ and those for the specular reflection coefficient $Ss(d_C, \lambda)$ may be determined independently. The reflection coefficients Sb and Ss for the primary color of the ink other than cyan can be also determined according to Equations (8) and (9).

FIG. 3(B) shows a process of determining the reflection coefficients for the secondary color. Referring to FIG. 3(B), $\xi_C(d_C)$ and $\eta_C(d_C)$ denote weighting coefficients related to the dot percent $d_C$ of cyan, and $\xi_M(d_M)$ and $\eta_M(d_M)$ denote weighting coefficients related to the dot percent $d_M$ of magenta. These weighting coefficients $\xi_C(d_C)$, $\eta_C(d_C)$, $\xi_M(d_M)$ and $\eta_M(d_M)$ constitute a two-dimensional space shown in FIG. 3(B) (hereinafter referred to as 'two-dimensional correction space'). A coordinate of a first coordinate axis (cyan axis) $A_{C1}$ of the two-dimensional correction space is expressed by the weighting coefficients $\xi_C$ and $\eta_C$, and another coordinate of a second coordinate axis (magenta axis) $A_{M1}$ is expressed by the weighting coefficients $\mu_M$ and $\eta_M$. The origin (0,0) of the two-dimensional correction space corresponds to sheet white, or a color having the dot percents of cyan and magenta both equal to 0%. The terminal point $(\eta_C+\xi_C, 0)$ of the cyan axis $A_C$ corresponds to a reference color having $d_C=100\%$ and $d_M=0\%$. The terminal point $(0, \eta_M+\xi_M)$ of the magenta axis $A_M$ corresponds to a reference color having $d_C=0\%$ and $d_M=100\%$. Among the four end points constituting the contour of the two-dimensional correction space, the last end point $(\eta_C+\xi_C, \eta_M+\xi_M)$ opposite to the origin (0,0) corresponds to a reference color having $d_C=100\%$ and $d_M=100\%$. Coordinates of a secondary target color having a dot percent $d_{C/M}$ are expressed as $(\eta_C, \eta_M)$.

The two-dimensional correction space is divided by two straight lines, which run through the coordinates $(\eta_C, \eta_M)$ corresponding to the target color and are perpendicular to either one of the cyan axis $A_{C1}$ and the magenta axis $A_{M1}$, into four partial two-dimensional correction spaces $V_{0/0}$, $V_{100/0}$, $V_{0/100}$, and $V_{100/100}$. The partial correction spaces may be simply referred to as 'partial spaces'. The subscript of the symbol representing each partial space denotes the dot percent $d_{C/M}$ at the end point of the whole space located at a diagonal position against each partial space. For example, the partial space $V_{0/0}$ is located at a diagonal position against the end point of the reference color $d_C=0\%$ and $d_M=0\%$. The partial space $V_{100/0}$ is located at a diagonal position against the end point of the reference color $d_C=100\%$ and $d_M=0\%$.

The diffuse reflection coefficient $Sb(d_{C/M}, \lambda)$ with respect to the secondary color of cyan and magenta is determined according to Equation (10) given below:

$$Sb(d_{C/M}, \lambda) = V_{0/0} \cdot Sb(d_{0/0}, \lambda) + V_{100/0} \cdot Sb(d_{100/0}, \lambda) + V_{0/100} \cdot Sb(d_{0/100}, \lambda) + V_{100/100} \cdot Sb(d_{100/100}, \lambda) \quad (10)$$

where $V_{0/0} = \xi_C(d_C) \cdot \xi_M(d_M)$ $V_{100/0} = \eta_C(d_C) \cdot \xi_M(d_M)$ $V_{0/100} = \xi_C(d_C) \cdot \eta_M(d_M)$ $V_{100/100} = \eta_C(d_C) \cdot \eta_M(d_M)$ and where $V_{0/0}$, $V_{100/0}$, $V_{0/100}$, and $V_{100/100}$ represent areas of the respective partial spaces. A concrete procedure of determining the weighting coefficients $\xi_C(d_C)$, $\eta_C(d_C)$, $\xi_M(d_M)$ and $\eta_M(d_M)$ will be described later.

The specular reflection coefficient $Ss(d_{C/M}, \lambda)$ at an arbitrary dot percent $d_{C/M}$ of cyan and magenta is determined according to an equation similar to Equation (10), and is not specifically described here. The weighting coefficients for the diffuse reflection coefficient Sb and those for the specular reflection coefficients Ss may be determined independently. The reflection coefficients Sb and Ss for the secondary color other than the combination of cyan and magenta can be also determined according to an equation similar to Equation (10).

FIG. 3(C) shows a process of determining the reflection coefficients for the tertiary color. Referring to FIG. 3(C), $\xi_Y(d_Y)$ and $\eta_Y(d_Y)$ denote weighting coefficients related to the dot percent $d_Y$ of yellow.

The weighting coefficients $\xi_C$, $\eta_C$, $\xi_M$, $\eta_M$, $\xi_Y$ and $\eta_Y$ for the tertiary color constitute a three-dimensional correction space shown in FIG. 3(C). The three-dimensional correction space is divided by three planes, which run through the coordinates $(\eta_C, \eta_M, \eta_Y)$ corresponding to the tertiary target color and are perpendicular to any one of the cyan axis $A_{C1}$, the magenta axis $A_{M1}$, and the yellow axis $A_{Y1}$, into eight partial three-dimensional correction spaces $V_{0/0/0}$ to $V_{100/100/100}$. The corrections spaces may also be referred to as 'partial spaces'. The subscript of the symbol representing each partial space denotes the dot percent $d_{C/M/Y}$ at the end point located at a diagonal position against each partial space.

The diffuse reflection coefficient $Sb(d_{C/M/Y}, \lambda)$ for the tertiary color of cyan, magenta, and yellow is determined according to Equation (11) given below:

$$Sb(d_{C/M/Y}, \lambda) = V_{0/0/0} \cdot Sb(d_{0/0/0}, \lambda) + V_{100/0/0} \cdot Sb(d_{100/0/0}, \lambda) + \quad (11)$$
$$V_{0/100/0} \cdot Sb(d_{0/100/0}, \lambda) + V_{0/0/100} \cdot Sb(d_{0/0/100}, \lambda) +$$
$$V_{0/100/100} \cdot Sb(d_{0/100/100}, \lambda) + V_{100/0/100} \cdot Sb(d_{100/0/100}, \lambda) +$$
$$V_{100/100/0} \cdot Sb(d_{100/100/0}, \lambda) + V_{100/100/100} \cdot Sb(d_{100/100/100}, \lambda)$$

where $V_{0/0/0} = \xi_C(d_C) \cdot \xi_M(d_M) \cdot \xi_Y(d_Y)$ $V_{100/0/0} = \eta_C(d_C) \cdot \xi_M(d_M) \cdot \xi_Y(d_Y)$ $V_{0/100/0} = \xi_C(d_C) \cdot \eta_M(d_M) \cdot \xi_Y(d_Y)$ $V_{0/0/100} = \xi_C(d_C) \cdot \xi_M(d_M) \cdot \eta_Y(d_Y)$ $V_{0/100/100} = \xi_C(d_C) \cdot \eta_M(d_M) \cdot \eta_Y(d_Y)$ $V_{100/0/100} = \eta_C(d_C) \cdot \xi_M(d_M) \cdot \eta_Y(d_Y)$ $V_{100/100/0} = \eta_C(d_C) \cdot \eta_M(d_M) \cdot \xi_Y(d_Y)$ $V_{100/100/100} = \eta_C(d_C) \cdot \eta_M(d_M) \cdot \eta_Y(d_Y)$ and where $V_{0/0/0}$ to $V_{100/100/100}$ represent areas of the respective partial spaces.

The specular reflection coefficient $Ss(d_{C/M/Y}, \lambda)$ at an arbitrary dot percent $d_{C/M/Y}$ is determined according to an equation similar to Equation (11), and is not specifically described here. The weighting coefficients for the diffuse reflection coefficient Sb and those for the specular reflection coefficients Ss may be determined independently. The reflection coefficients Sb and Ss for the tertiary color other than the combination of cyan, magenta, and yellow can be also determined according to an equation similar to Equation (11).

Equations (8) through (11) are generalized to determine a diffuse reflection coefficient $S_b(d_{1-n},\lambda)$ for an n-order color of an arbitrary dot percent, where n is an integer of not less than 2, according to Equation (12) given below:

$$S_b(d_{1-n}, \lambda) = \sum_{i=1}^{2^n} V_i \cdot S_b(refd_i, \lambda) \tag{12}$$

where $$V_i = \prod_{k=1}^{n} \chi_k$$

$\chi_k = \xi_k$ if $d_k$ for $refd_i = 0\%$;

$\chi_k = \eta_k$ if $d_k$ for $refd_i = 100\%$ and where $S_b(refd_i=0,\lambda)$ denotes reference diffuse reflection coefficients of the reference colors located at $2^n$ end points constituting the contour of an n-order correction space, and $refd_i$ denotes a dot percent of an i-th reference color (i=1 to $2^n$). By way of example, $refd_1$ and $refd_4$ corresponds to $d_{0/0/0}$ and $d_{100/100/100}$, respectively, in Equation (11). $V_i$ denotes a volume of a partial n-order correction space, which is located at a diagonal position against the end point corresponding to the i-th reference color. The 'volume' implies a spatial integral of the partial space. When the partial space is a two-dimensional space, the 'volume' implies an area. When the partial space is a three-dimensional space, the 'volume' implies a volume in a normal sense. On the second line in Equation (12), $\chi_k$ (k=1 to n) is equal to $\eta_k$ when a dot percent $d_k$ of a k-th ink included in the i-th reference color is equal to 0%, and equal to $\xi_k$ when the dot percent $d_k$ is equal to 100%. The operator $\Pi$ on the second line in Equation (12) represents multiplication of n pieces of values $\chi_k$.

Equation (12) multiplies the reference diffuse reflection coefficient $S_b(refd_i,\lambda)$ with respect to the i-th reference color among the $2^n$ reference colors by the volume $V_i$ of the partial n-order correction space, which is located at a diagonal position against the end point corresponding to the i-th reference color, and sums up the results of multiplication for the $2^n$ reference colors, so as to determine the diffuse reflection coefficient $S_b(d_{1-n},\lambda)$ for the n-order target color.

A specular reflection coefficient $S_s(d_{1-n},\lambda)$ for an n-order color of an arbitrary dot percent, where n is an integer of not less than 2, is determined according to Equation (13), which is similar to Equation (12):

$$S_s(d_{1-n}, \lambda) = \sum_{i=1}^{2^n} V_i \cdot S_s(refd_i, \lambda) \tag{13}$$

The following describes a method of determining reflection coefficients for the primary color and a method of determining reflection coefficients for the secondary color and the higher-order colors.

C. Method of Determining Reflection Coefficients for Primary Color

The diffuse reflection coefficient Sb and the specular reflection coefficient Ss at an arbitrary dot percent of a primary color are determined according to Equations (8) and (9) given above, respectively.

FIGS. 4(A)–4(C) show a method of determining the diffuse reflection coefficient Sb for the primary color according to Equation (8). In the drawing of FIGS. 4(A)–4(C), symbols without subscripts 'd', 'ξ', and 'η' are used in order to clearly indicate that a target is an arbitrary ink.

Reference diffuse reflection coefficients $Sb(0\%,\lambda)$ and $Sb(100\%,\lambda)$ are experimentally determined in advance at reference dot percents (0%,100%) as discussed later. The reference diffuse reflection coefficients $Sb(0\%,\lambda)$ and $Sb(100\%,\lambda)$ depend upon the wavelengths $\lambda$ of light and are thereby determined for each value of the wavelengths $\lambda$ as discussed later. By way of example, in case that the wavelengths of visible rays (about 380 to 780 nm) are divided into approximately 60 wavelength domains, the reference diffuse reflection coefficients $Sb(0\%,\lambda)$ and $Sb(100\%,\lambda)$ for each wavelength domain are obtained in advance. A concrete procedure of determining the reference diffuse reflection coefficients $Sb(0\%,\lambda)$ and $Sb(100\%,\lambda)$ will be discussed later.

The respective weighting coefficients $\xi(d)$ and $\eta(d)$ depend upon the dot percent d as shown in FIG. 4(B). The value of the weighting coefficient $\xi(d)$ with respect to the reference diffuse reflection coefficient $Sb(0\%,)$ is equal to 1 when the dot percent d of a target printed area is equal to 0%, and equal to 0 when the dot percent d is equal to 100%. On the contrary, the value of the weighting coefficient $\eta(d)$ with respect to the reference diffuse reflection coefficient $Sb(100\%,\lambda)$ is equal to 1 when the dot percent d of a target printed area is equal to 100%, and equal to 0 when the dot percent d is equal to 0%. FIG. 4(C) shows a one-dimensional correction space defined by these weighting coefficients $\xi$ and $\eta$.

Referring to FIG. 4(B), a variation in weighting coefficient e is represented by eleven points (shown by closed circles in the drawing) in the range of $0 \leq d \leq 100\%$. The value of the weighting coefficient $\xi$ at an arbitrary dot percent d is determined by interpolating the eleven values of the coefficient $\xi$. One available process determines the weighting coefficient $\xi(d)$ by linearly interpolating the two values of coefficient $\xi$ at two dot percents closest to the target dot percent d. Another available process determines the weighting coefficient $\xi(d)$ by non-linearly interpolating the values of coefficient $\xi$ at three or more different points. This is also applicable to the other weighting coefficient $\eta(d)$.

It is required to determine the following elements in advance, in order to determine an illuminance spectrum $I(d,\theta,\rho,\lambda)$ of reflected light from a printed area at an arbitrary dot percent d according to Equations (7) through (9) discussed above:

(1) reference diffuse reflection coefficients $Sb(0\%,\lambda)$ and $Sb(100\%,\lambda)$;

(2) reference specular reflection coefficients $Ss(0\%,\lambda)$ and $Ss(100\%,\lambda)$;

(3) variations in weighting coefficients $\xi(d)$ and $\eta(d)$ (see FIG. 4(B)); and (4) form of the characteristic fs(ρ) depending upon the angle ρ.

The following describes a method of determining the above required elements (hereinafter referred to as 'reference data') and reproducing a print based on these reference data.

D. Processing Routine in Embodiment

Figure 5:
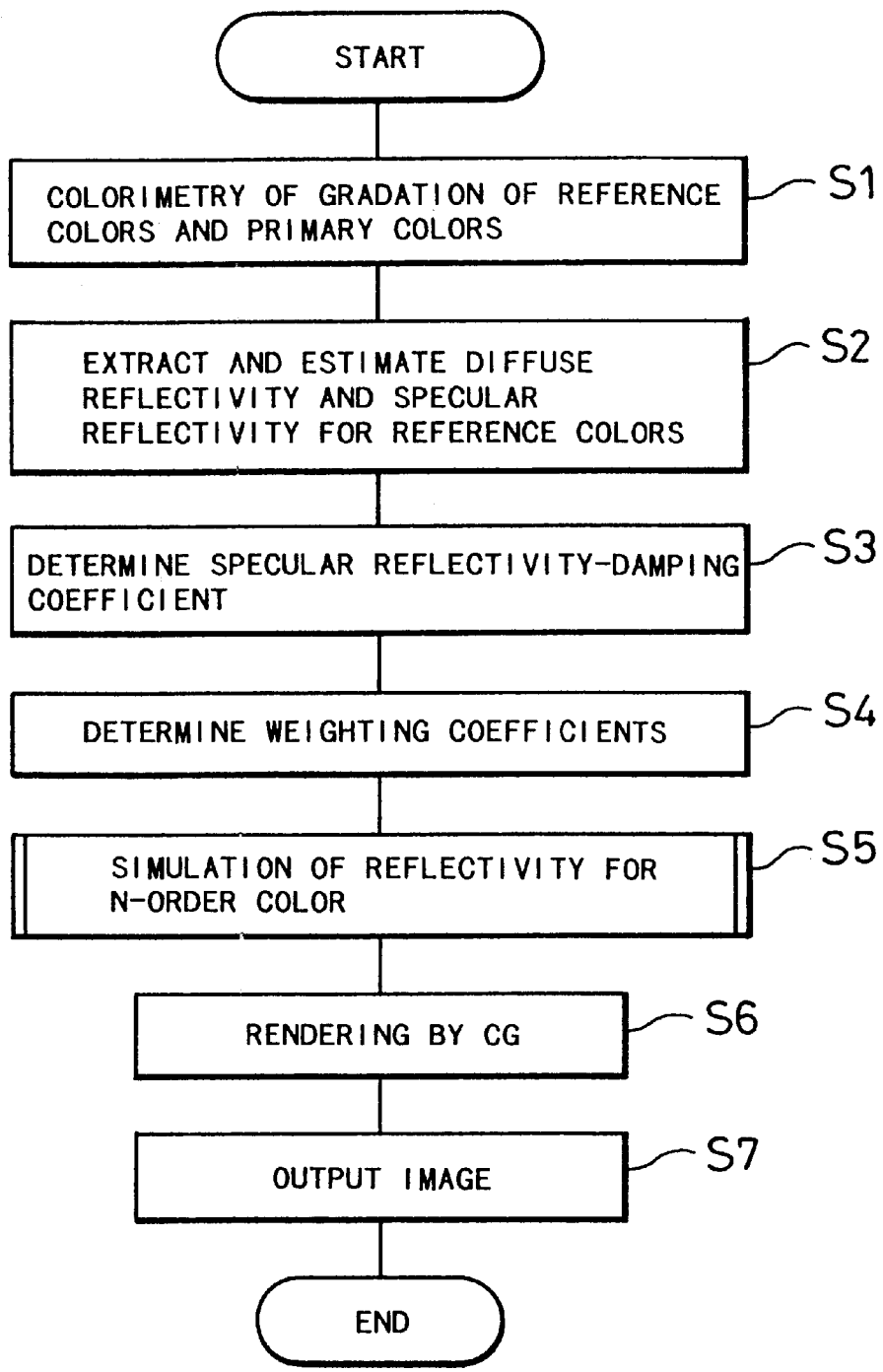
FIG. 5 is a flowchart showing a processing routine executed in the embodiment.
Figure 6:
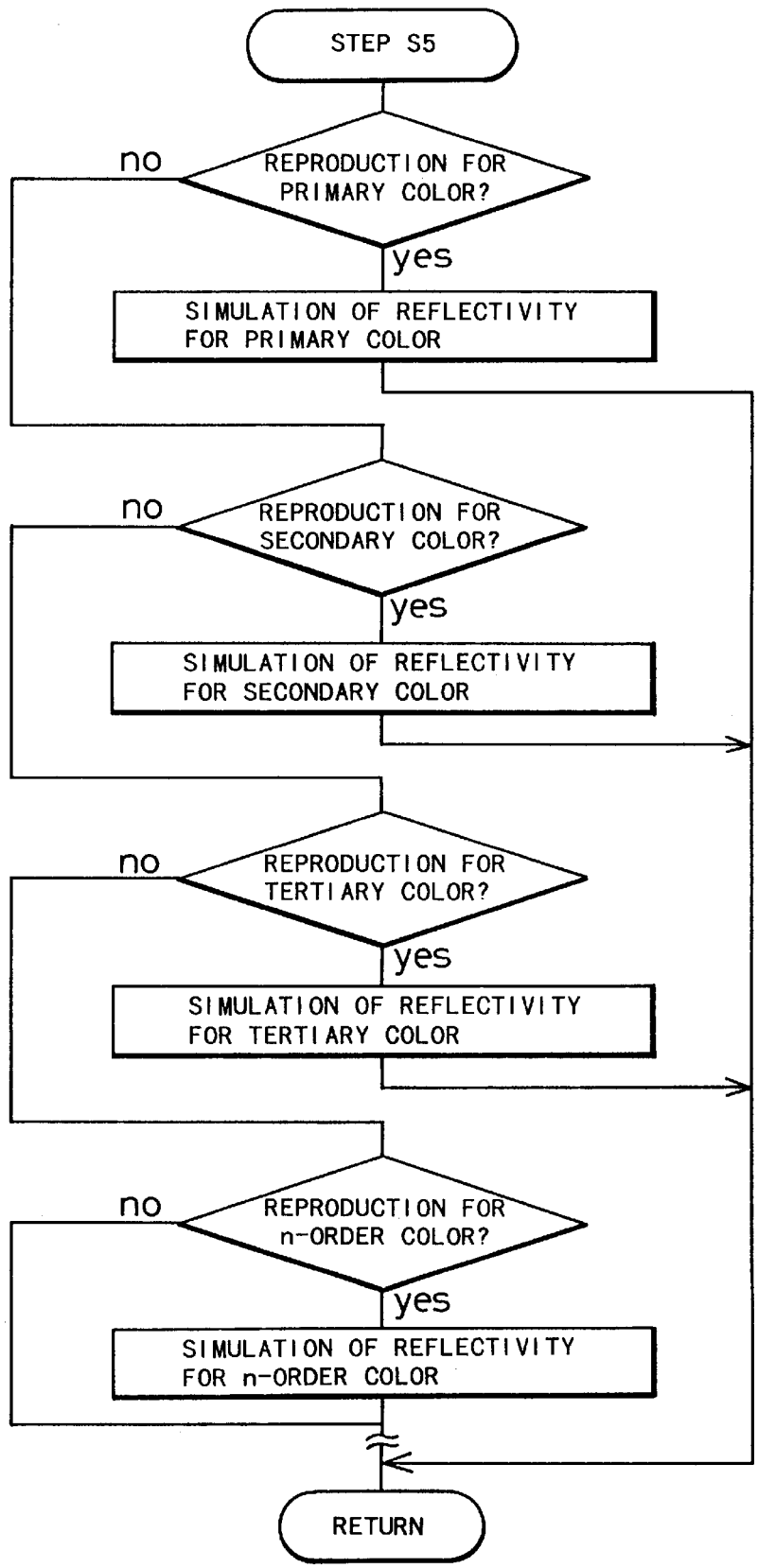
FIG. 6 is a flowchart showing a processing routine executed in the embodiment.

FIGS. 5 and 6 are flowcharts showing a processing routine executed in the embodiment. At step S1 in FIG. 5, a gradation was produced including reference colors and a plurality of primary colors other than the reference colors for each ink, which is a constituent of an N-order color, and a spectral reflectivity thereof was measured. The 'reference colors' here imply colors of the color chips whose dot percents are related to the reference reflection coefficients in the above Equations (8) and (9) (that is, 0% and 100%). The reference colors represent colors having the dot percents related to the reference reflection coefficients, among the primary colors. The 'gradation' implies a print, in which the color chips of the reference colors and the primary colors are arranged in the order of the dot percent.

Figure 7:
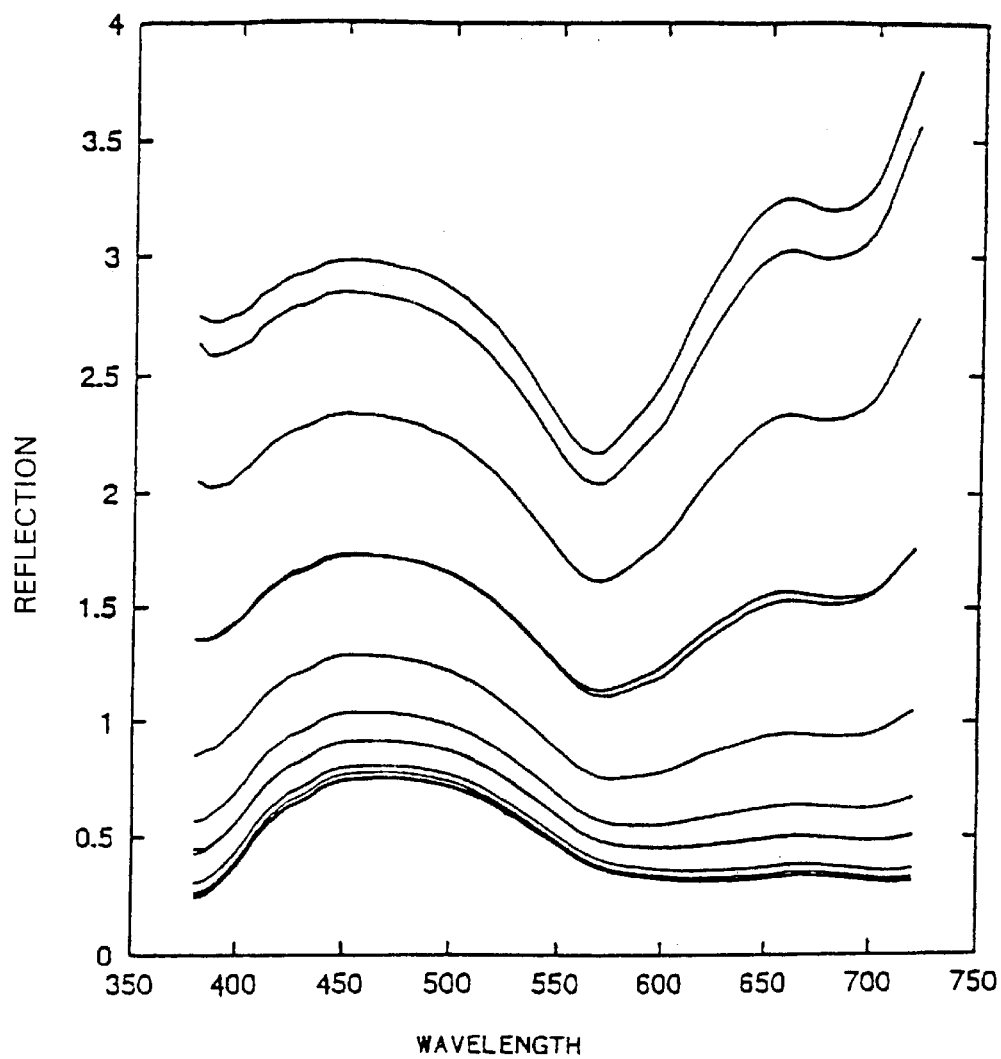
FIGS. 7(A)–7(C) show the details of the process carried out at step S1.

FIGS. 7(A)–7(C) show the details of the process carried out at step S1. In the gradation created, a printing ink of one color (for example, cyan) was printed from 0% to 100% by every 10% as shown in FIG. 7(A). FIG. 7(B) shows measurement conditions for the spectral reflectivity. The spectral reflectivity is obtained by normalizing the illuminance spectrum $I(d,\theta,\rho,\lambda)$ of reflected light with a luminance spectrum $\phi(\lambda)$ of incident light, and is accordingly expressed as $I(d,\theta,\rho,\lambda)/\phi(\lambda)$. As shown in FIG. 7(B), two points of 8° and 10° were set as the angle of reflection θ in this embodiment. The angles in the range of −10° to 34° by every 2° and the angle 35° were set as the angle of deviation ρ. In Equation (7) discussed above, cos θ is the only element depending upon the angle of reflection θ. One value is accordingly sufficient for the angle of reflection θ set as the measurement condition. In this embodiment, however, two values were set as the angle of reflection θ for the purpose of improving the accuracy. The angle of deviation ρ was set at relatively small intervals, in order to determine the dependency of the element $fs(\rho)$ upon the angle of deviation ρ (that is, the functional form of $fs(\rho)$).

Figure 8:
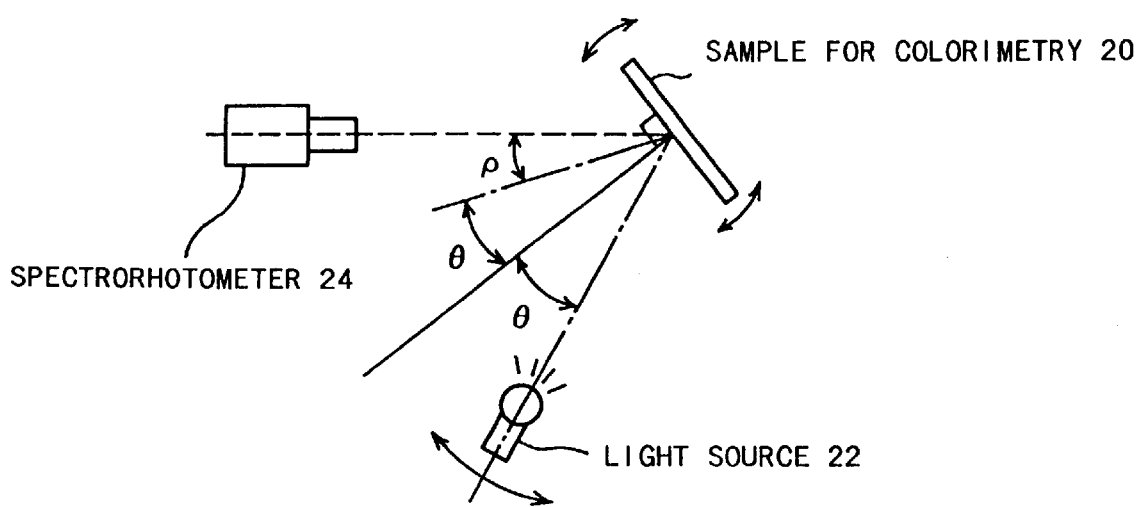
FIG. 8 conceptually illustrates an apparatus for measuring the spectral reflectivity.

At step S1, the spectral reflectivity shown in FIG. 7(C) was measured under each of the measurement conditions shown in FIG. 7(B) for each of the eleven color chips shown in FIG. 7(A). FIG. 8 conceptually illustrates an apparatus for measuring the spectral reflectivity. A colorimetry sample 20 was mounted on a sample table (not shown) and irradiated with light emitted from a light source 22, and the illuminance spectrum $I(d,\theta,\rho,\lambda)$ of reflected light was measured by a spectrophotometer 24. A standard white plate as well as the respective color chips of the gradation shown in FIG. 7(A) were used as the colorimetry sample 20. The standard white plate used in the embodiment has the spectral reflectivity approximately equal to one. The illuminance spectrum of reflected light from the standard white plate accordingly corresponds to the luminance spectrum $\phi(\lambda)$ of incident light. The spectral reflectivity was thus calculated by normalizing the illuminance spectrum $I(d,\theta,\rho,\lambda)$ of reflected light for each color chip with the luminance spectrum $\phi(\lambda)$ for the standard white plate. The standard white plate has the specular reflection component substantially equal to zero, and its measurement accordingly does not depend upon the angle of deviation ρ. The angle of incidence θ (at least either one of 8° and 10°) that was identical with those of the other colorimetry samples was set as the measurement condition for the standard white plate, while the angle of deviation ρ was set equal to −10°.

The measured data were analyzed by a personal computer. The light source 22 used was a day-light flood lamp of standard light D65. The measurement was carried out in a darkroom, in order to realize the ideal state observation free from ambient light.

Figure 9:
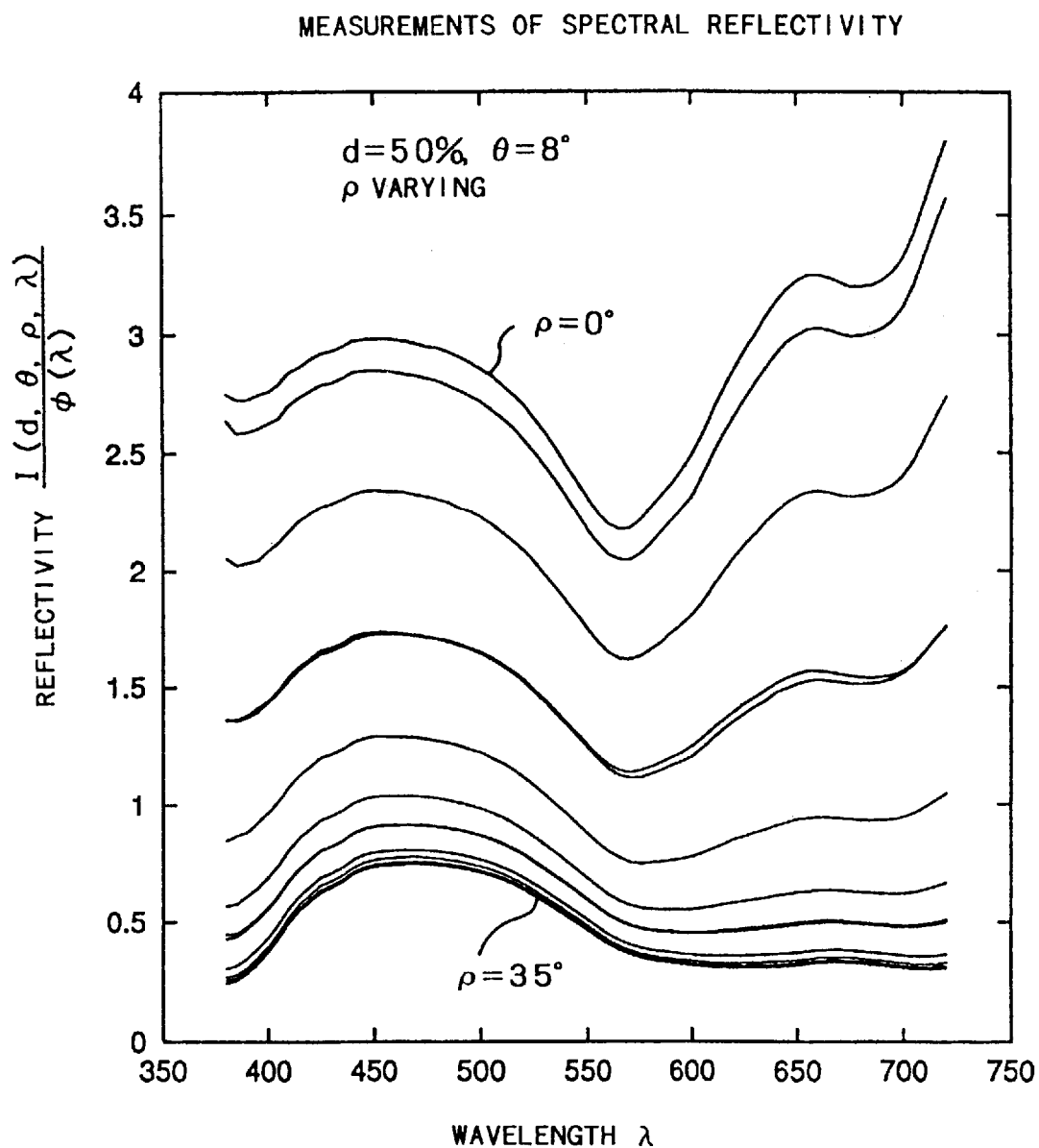
FIG. 9 is a graph showing the measurements of spectral reflectivity.

FIG. 9 is an enlarged graph showing the measurements of spectral reflectivity shown in FIG. 7(C). This graph shows a plurality of results of measurement with a varying angle of deviation ρ under the condition of the dot percent d=50% and the angle of incidence θ=8°. The reflectivity of 1.0 represents the level of the illuminance spectrum of the standard white plate. The spectral reflectivity of the colorimetry sample may exceed 1.0. This is because the measurement of the standard white plate does not include the specular reflection component and the measurements of the colorimetry sample including the specular reflection component may thus be greater than that of the standard white plate.

Referring back to the flowchart of FIG. 5, the process at step S2 extracted diffuse reflection components $Ib(d,\theta,\lambda)$ in Equation (7) from the measurements of spectral reflectivity for the primary colors, and estimated specular reflection components $Is(d,\eta,\lambda)$. FIGS. 10(A)–10(D) show a process of determining the diffuse reflection components and the specular reflection components based on the spectral reflectivities and subsequently determining the weighting coefficients ξ and η. At step S2, the diffuse reflection components shown in FIG. 10(B) were extracted from the spectral reflectivities shown in FIG. 10(A), and the specular reflection components shown in FIG. 10(C) were then estimated.

The spectral reflectivities under the condition of ρ=35° and θ=8° were used in the extraction of the diffuse reflection component. Since the dependency upon the angle of incidence θ is known to be defined as cos θ, either one of 8° and 10° may be selected for the value of the angle of incidence θ. The largest value 35° among the measurement conditions was selected as the angle of deviation ρ. The following gives the reason of such selection. As discussed previously, the dependency $fs(\rho)$ upon the angle of deviation ρ included in Equation (7) represents the characteristic that is equal to 1 when ρ=0 and abruptly decreases in a monotonic manner with an increase in ρ in the range of $0 \leq \rho \leq 90°$. As clearly understood from Equation (7), upon condition that ρ is sufficiently large and the angular component $fs(\rho)$ can be regarded as zero, the specular reflection component $Is(d,\rho,\lambda)/100$ $(\lambda)=Ss(d,\lambda)fs(\rho)$ is equal to zero. Under such conditions, the measured value of the spectral reflectivity corresponds to the diffuse reflection component $Ib(d,\theta,\lambda)/\phi(\lambda)=Sb(d,\lambda)\cos\theta$. Since the angular component $fs(\rho)$ has a value close to $\cos^n\rho$, where n ranges approximately from 300 to 400, the error caused by assuming $fs(35°)$ as zero is negligibly small.

Figure 11:
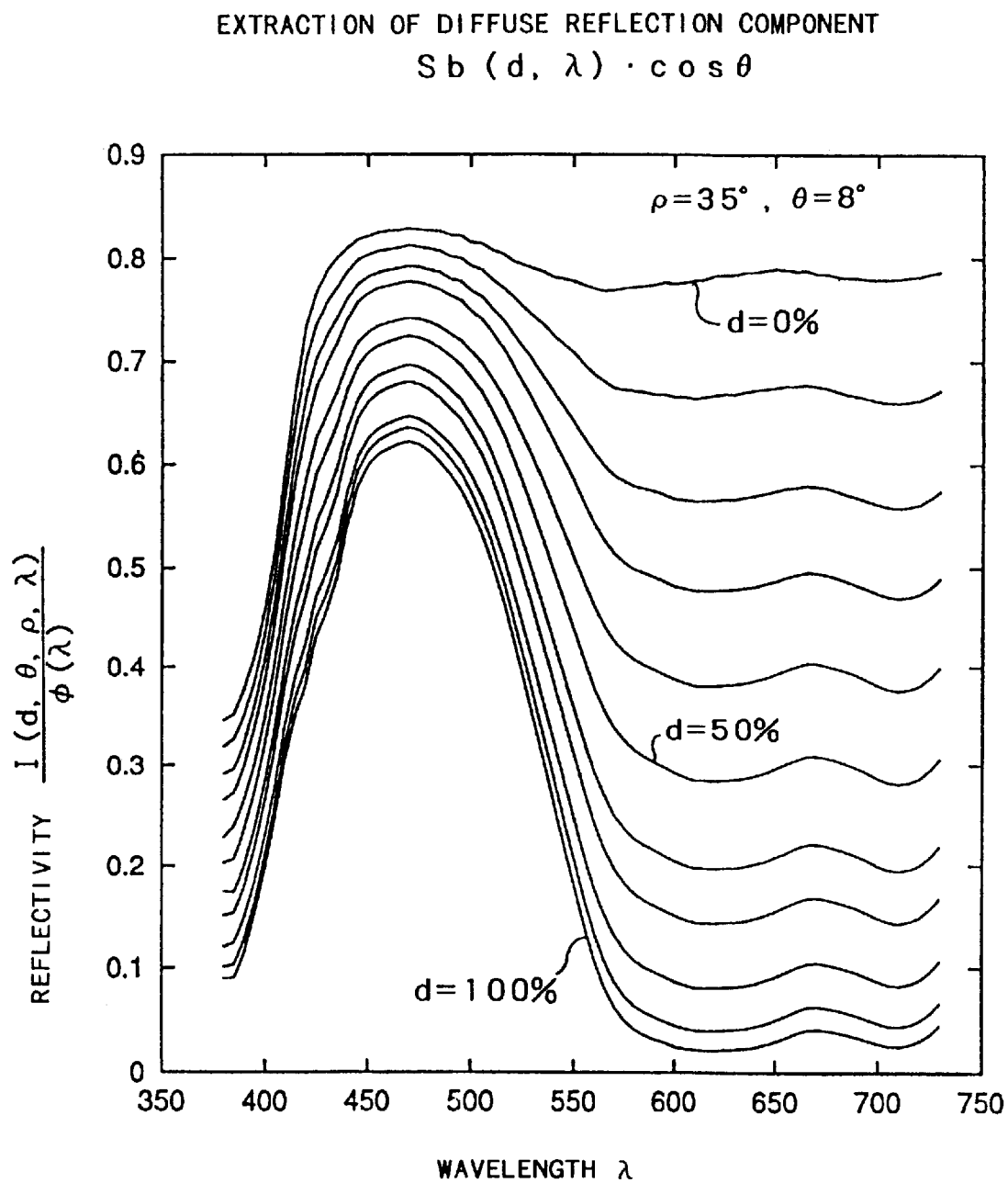
FIG. 11 is a graph showing the plot of diffuse reflection component S(d,λ)·cos θ extracted under the condition of ρ=35° and θ=8°.

FIG. 11 is a graph showing the plot of diffuse reflection component $Sb(d,\lambda)\cos\theta$ extracted under the condition of ρ=35° and θ=8°. This graph shows the wavelength dependency of the diffuse reflection component $Sb(d,\lambda)\cos\theta$ for each color chip having different dot percent d. In this embodiment, the diffuse reflection coefficient $Sb(d,\lambda)$ was calculated by dividing the diffuse reflection component by cos θ as shown in Equation (14) given below:

$$Sb(d, \lambda) = \frac{Ib(d, \theta, \lambda)}{\cos\theta \cdot \phi(\lambda)} \qquad (14)$$

The spectral reflectivities under the condition of ρ=0° and θ=8° were used in the estimation of the specular reflection component $Is(d,\rho,\lambda)$. The angle of incidence θ used here was equal to the condition in the extraction of the diffuse reflection component. The angle of deviation ρ was set equal to 0°, in order to select the condition realizing $fs(\rho)=1$. The detailed form of the dependency $fs(\rho)$ upon the angle of deviation is unknown, but it is known that $fs(0)=1$ according to the definition thereof. Namely when the angle of deviation ρ is equal to zero, the specular reflection component $Is(d,\rho=0,\lambda)$ is equal to the product of the specular reflectivity $Ss(d,\lambda)$ and the spectrum $\phi(\lambda)$ of incident light. Determination of the specular reflection component $Is(d,\rho=0,\lambda)$ under the condition of ρ=0 accordingly determines the specular reflectivity $Ss(d,\lambda)$.

Based on Equation (7) discussed above, the spectral reflectivity $I(d,\theta,\rho=0,\lambda)/\phi(\lambda)$ at the angle of deviation $\rho=0°$ is defined by Equation (15) given below:

$$\frac{I(d, \theta, \rho = 0, \lambda)}{\phi(\lambda)} = Sb(d, \lambda) \cdot \cos\theta + Ss(d, \lambda) \quad (15)$$

Equation (15) is rewritten to Equation (16) to determine the specular reflection component $Ss(d,\lambda)$:

$$Ss(d, \lambda) = \frac{I(d, \theta, \rho = 0, \lambda)}{\phi(\lambda)} - Sb(d, \lambda) \cdot \cos\theta \quad (16)$$

Figure 12:
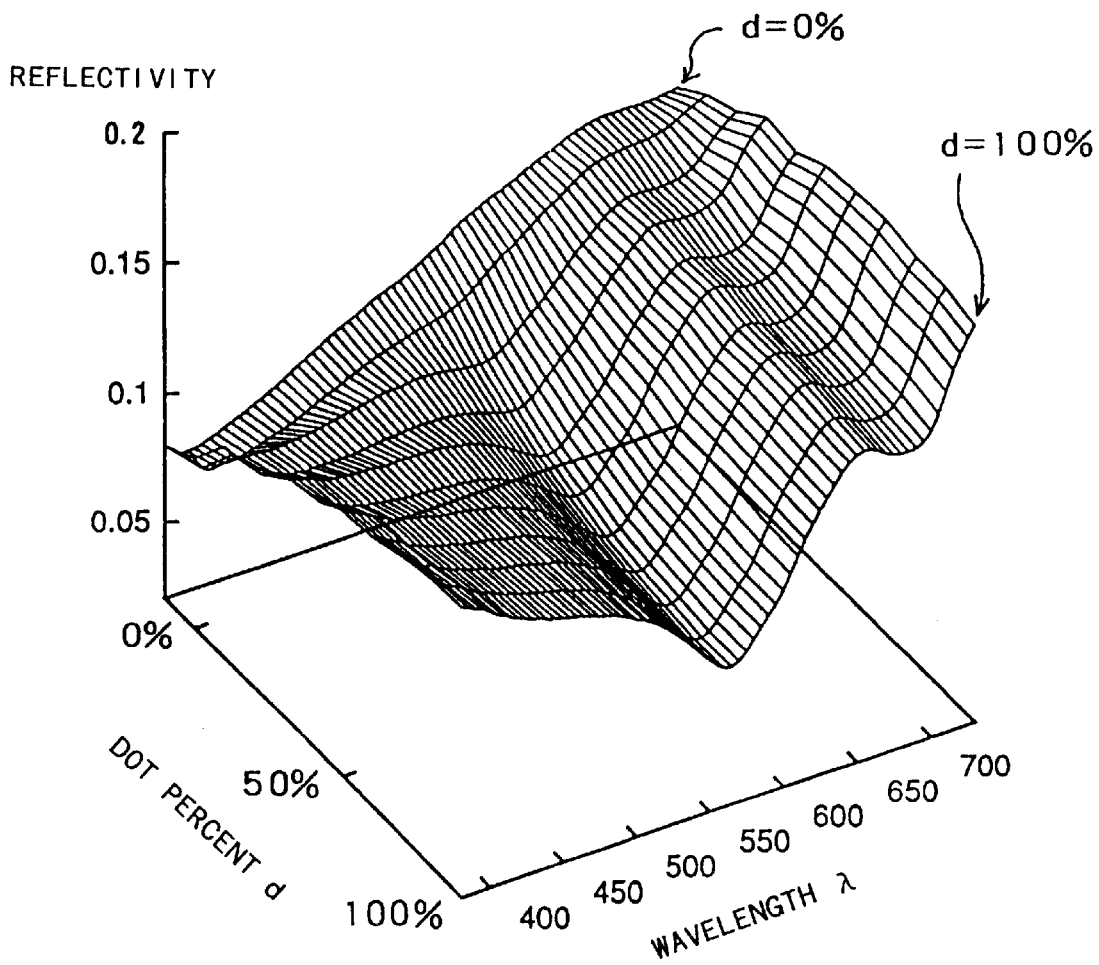
FIG. 12 is a graph showing the plot of specular reflection component Ss(d,λ) estimated under the condition of θ=8°.

FIG. 12 is a graph showing the plot of specular reflection coefficient $Ss(d,\lambda)$ estimated according to Equation (16) under the condition of $\theta=8°$. This graph shows the wavelength dependency of the specular reflection coefficient $Ss(d,\lambda)$ for each color chip of the primary color having different dot percent d.

Referring back again to the flowchart of FIG. 5, the process at step S3 determined the form of the dependency $fs(\rho)$ of the specular reflection component upon the angle of deviation $\rho$. The dependency $fs(\rho)$ may also be referred to as the 'specular reflectivity-damping coefficient'. As clearly understood from Equation (7) discussed above, the spectral reflectivity $I/\phi$ depends upon only the angle of deviation p, upon condition that the dot percent d, the angle of incidence $\theta$, and the wavelength $\lambda$ are all fixed. The functional form of the dependency $fs(\rho)$ was accordingly determined by measuring the dependency of the spectral reflectivity $I/\phi$ upon the angle of deviation $\rho$ while the dot percent d, the angle of incidence $\theta$, and the wavelength $\lambda$ were all fixed. It was then found that $fs(\rho)$ had the functional form of the Gaussian distribution defined by Equation (17) given below:

$$fs(\rho) = e^{-\sigma\rho^2} \quad (17)$$

wherein the constant a ranges from approximately 70 to 90. The unit of the angle of deviation p is radian. In this embodiment $\sigma=80$ was obtained by the least squares method.

Equation (18) may be applicable for the functional form of $fs(\rho)$.

$$fs(\rho) = \cos^{n_0}\rho \quad (18)$$

wherein the exponent $n_0$ ranges from approximately 350 to 400. Both the dependency $fs(\rho)$ given by Equation (17) and that given by Equation (18) represent the characteristic that is equal to one when $\rho=0$ and abruptly decreases in a monotonic manner with an increase in $\rho$ in the range of $0 \leq \rho \leq 90°$.

Figure 10:
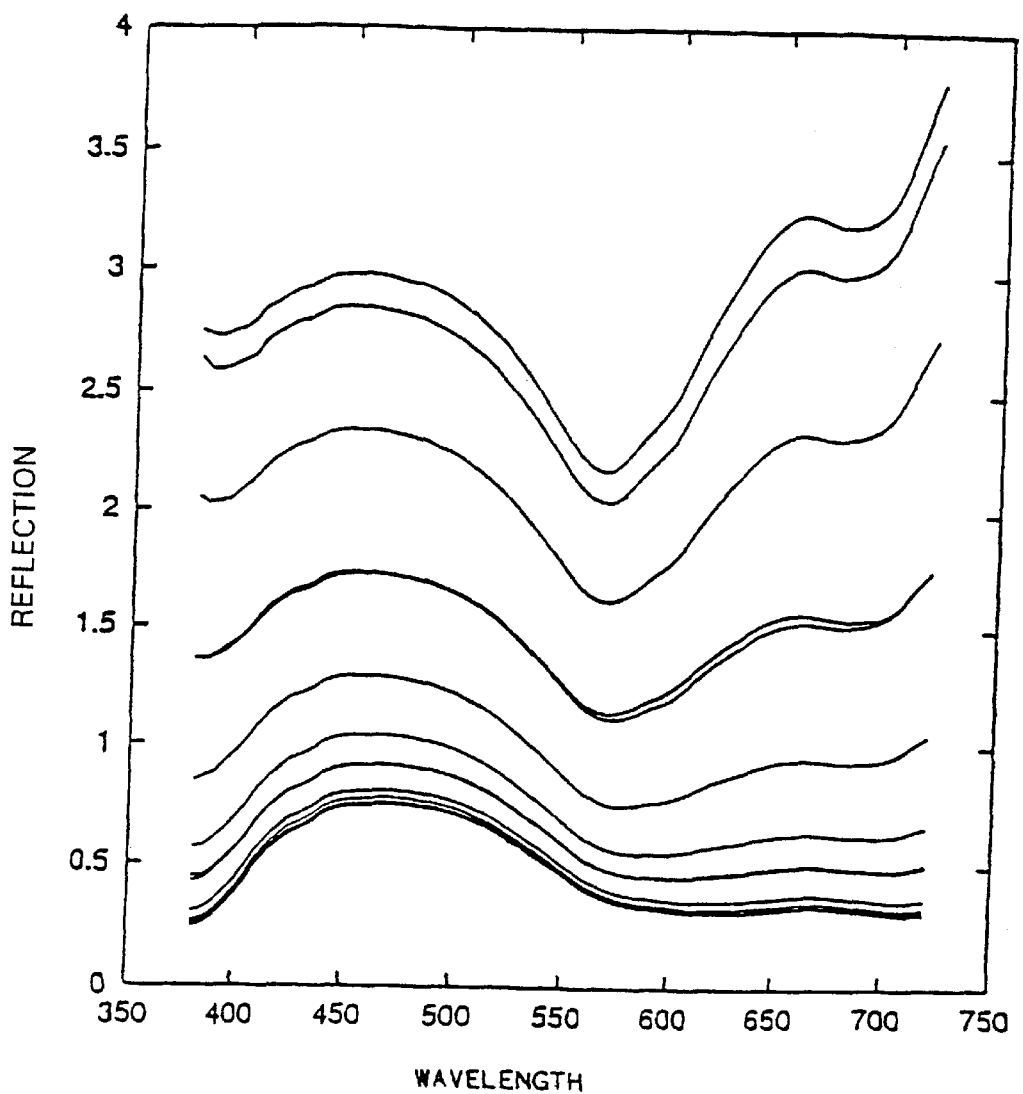
FIGS. 10(A)–10(D) show a process of determining the diffuse reflection components and the specular reflection components based on the spectral reflectivities and subsequently determining the weighting coefficients ξ and η.

Referring back again to the flowchart of FIG. 5, the process at step S4 determined the weighting coefficients $\xi$ and $\eta$ (see FIG. 10(D)) used in Equations (8) and (9) mentioned above. In this embodiment, the weighting coefficients $\xi$ and $\eta$ were calculated from the diffuse reflection coefficient $Sb(d,\lambda)$ obtained at step S2 according to the following procedure. Equation (8) given above was expanded to simultaneous equations regarding plural values of the wavelength $\lambda$, and the simultaneous equations were written as Equations (19) and (20) using the matrices:

$$V_{org\#} = K_{\xi\eta} \cdot V_{prim\#} \quad (19)$$

$$V_{org\#} = (Sb(d_k, \lambda)) = \begin{pmatrix} Sb(d_k, \lambda min) \\ \ldots \\ Sb(d_k, \lambda max) \end{pmatrix} \quad (20)$$

where $$K_{\xi\eta} = (\xi_k(d_k)\eta_k(d_k))$$

$$V_{prim\#} = \begin{pmatrix} Sb(d_k = 0\%, \lambda) \\ Sb(d_k = 100\%, \lambda) \end{pmatrix} = \begin{pmatrix} Sb(0\%, \lambda_{min}) & \cdots & Sb(0\%, \lambda_{max}) \\ Sb(100\%, \lambda_{min}) & \cdots & Sb(100\%, \lambda_{max}) \end{pmatrix}$$

As shown in Equations (20), the matrix Vorg# represents the value of the diffuse reflection coefficient $Sb(d_k,\lambda)$ with respect to each wavelength in the wavelength range ($\lambda$min to $\lambda$max) of visible rays at an arbitrary dot percent $d_k$ of a k-th ink. The matrix $K_{\xi\eta}$ represents the weighting coefficients $\xi_k$ and $\eta_k$. The matrix Vprim# represents the values of the reference diffuse reflection coefficients $Sb(0\%,\lambda)$ and $Sb(100\%,\lambda)$ with respect to each wavelength ($\lambda$min to $\lambda$max). Here $\lambda$min and $\lambda$max respectively denote the minimum and the maximum of the wavelengths $\lambda$ of visible rays. By way of example, when the wavelengths $\lambda$ of visible rays are divided into 60 wavelength domains, Equation (19) corresponds to the 60 simultaneous equations.

The values of the diffuse reflection coefficient $Sb(d_k,\lambda)$ with respect to the eleven values of the dot percent $d_k$ (0%, 10%, ..., 100%) (that is, the matrix Vprim#) are obtained at step S2 as discussed previously. Only the matrix $K_{\xi\eta}$, representing $\xi_k$ and $\eta_k$ is unknown in the right-hand side of Equation (19). When the simultaneous equations (Equation (19)) having the number of unknown elements less than the number of equations are solved for the unknown matrix $K_{\xi\eta}$, the result obtained is equivalent to approximation of the unknown values $\xi_k$ and $\eta_k$ by the least squares method. In accordance with a concrete procedure, when the matrix $K_{\xi\eta}$ is determined according to Equation (21) for the eleven values of the dot percent $d_k$ (0%, 10%, ..., 100%), eleven sets of weighting coefficients $\xi_k(d_k)$ and $\eta_k(d_k)$ ($d_k$=0%, 10%, ..., 100%) are obtained.

$$K_{\xi\eta} = (\xi_k(d_k)\eta_k(d_k)) = V_{org\#}(V_{prim\#})^{-1} \quad (21)$$

The variations in weighting coefficients $\xi(d)$ and $\eta(d)$ shown in FIG. 4(B) are results thus obtained.

The process at step S5 in the flowchart of FIG. 5 carried out simulation for the N-order color based on the results obtained at steps S2 through S4. FIG. 6 shows the details of the process carried out at step S5. As shown in FIG. 6, the reflectivity for an arbitrary n-order color, where n is an integer of not less than 2, is determined selectively and directly in this embodiment.

Simulation of the reflectivity for the primary color is carried out in the following manner. The diffuse reflection coefficient $Sb(d,\lambda)$ at an arbitrary dot percent d is calculated from the weighting coefficients $\xi(d)$ and $\eta(d)$ and the reference diffuse reflection coefficients $Sb(0\%,\lambda)$ and $Sb(100\%,\lambda)$ according to Equation (8) discussed above. The specular reflection coefficient $Ss(d,\lambda)$ is calculated in a similar manner according to Equation (9) discussed above.

Figure 13:
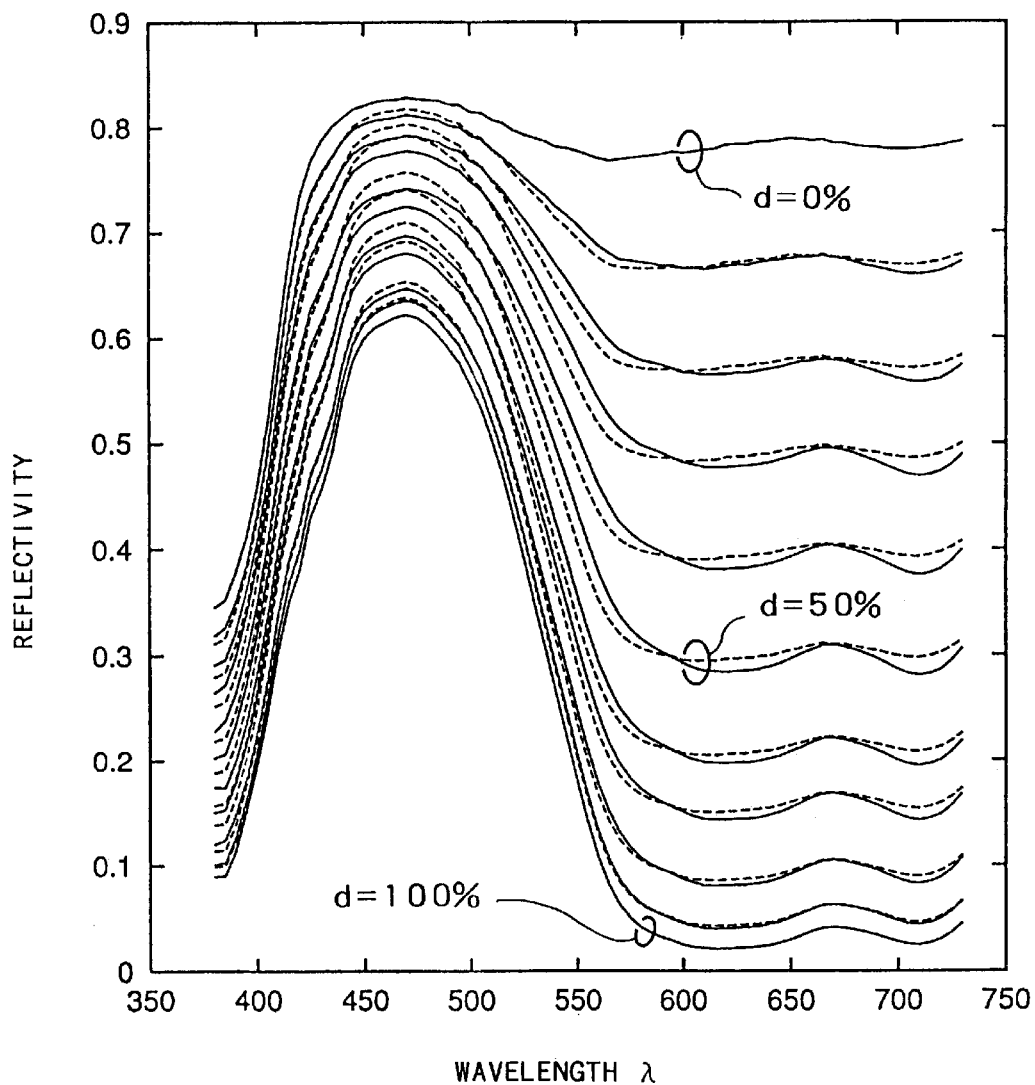
FIG. 13 is a graph showing comparison between the measured values of the diffuse reflection component Sb(d, λ)cos θ and the results of simulation.

FIG. 13 is a graph showing comparison between the measured values of the diffuse reflection component $Sb(d, \lambda)\cos\theta$ (shown by the solid lines) and the results of simulation according to Equation (8) (shown by the broken lines). The solid lines well agree with the broken lines. As for the specular reflection component, the measured values relatively well agree with the result of simulation.

Determination of the reference diffuse reflection coefficients and the reference specular reflection coefficients is carried out for each ink, which is a constituent of the high-order color, by the processing of steps S1 through S4 in the flowchart of FIG. 5. The weights $\xi$ and $\eta$ are also obtained for each ink.

In order to determine the reflection coefficients for a secondary target color as shown in FIG. 3(B), it is required to determine the reference reflection coefficients at end points (that is, reference colors) of the four sides constituting a two-dimensional color space including the target color. In this case, the reference reflection coefficients on the four sides are respectively determined according to the routine of FIG. 5. By way of example, a gradation, in which cyan is fixed to 100% and magenta varies from 0% to 100% by every 10%, is produced, in order to determine the reference reflection coefficients at both end points (closed circles) on a side $A_{M2}$ on which cyan is 100% in FIG. 3(B). Although this gradation is printed in cyan and magenta and thereby represents a secondary color, the reference reflection coefficients can be determined according to the routine of FIG. 5. It is preferable to determine the weighting coefficients $\xi$ and $\eta$ independently for each of the four sides. An identical set of values $\xi$ and $\eta$ may, however, be commonly applied to the parallel sides; a first set common to sides $A_{C1}$ and $A_{C2}$, and a second set common to sides $A_{M1}$ and $A_{M2}$ in FIG. 3(B).

In order to determine the reflection coefficients for a tertiary target color as shown in FIG. 3(C), it is required to determine the reference reflection coefficients at end points of the twelve sides constituting a three-dimensional color space including the target color (that is, the color solid). In this case, the reference reflection coefficients on the twelve sides are respectively determined according to the routine of FIG. 5. It is preferable to determine the weighting coefficients $\xi$ and $\eta$ independently for each of the twelve sides. An identical set of values $\xi$ and $\eta$ may, however, be commonly applied to the parallel sides.

The description on the reference reflection coefficients to be determined in the secondary color and the tertiary color is readily generalized to the case of N-order color. In order to determine the reflection coefficients for an N-order target color, it is required to determine the reference reflection coefficients at end points of the $N \times 2^{(N-1)}$ sides constituting an N-dimensional color space including the target color according to the routine of FIG. 5.

E. Method of Determining Reflection Coefficients for Secondary Color

Figure 14:
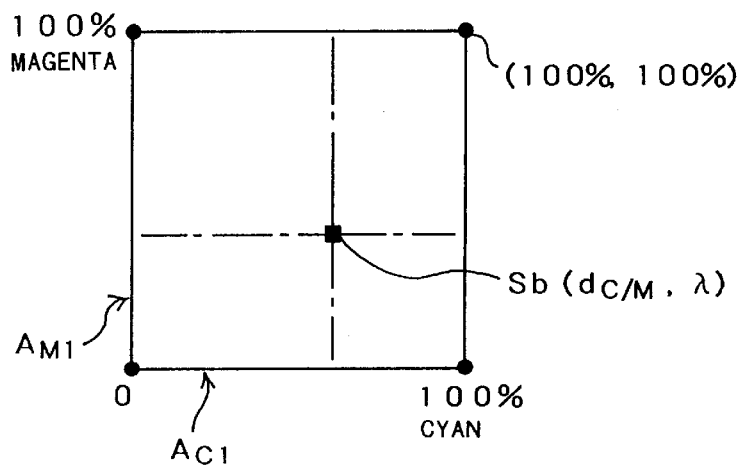
FIGS. 14(A)–14(D) show a method of determining the reflection coefficients for the secondary color.
Figure 14:
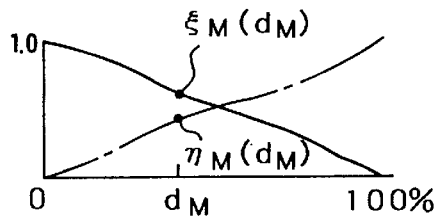
Figure 14:
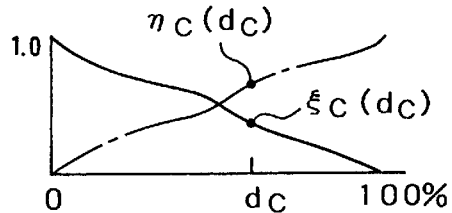
Figure 14:
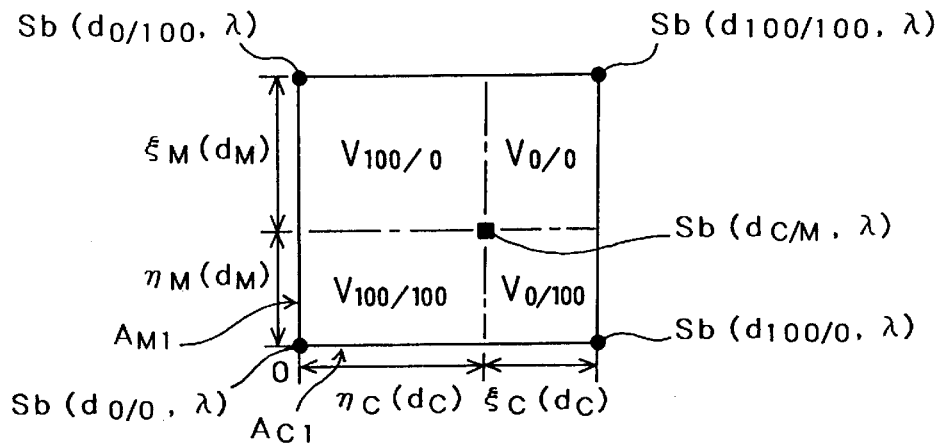

As mentioned above, the diffuse reflection coefficient at an arbitrary dot percent of the secondary color is given by Equation (10). FIGS. 14(A)–14(D) show a method of determining the diffuse reflection coefficient Sb for the secondary color according to Equation (10). FIG. 14(A) shows a two-dimensional color space, and FIGS. 14(B) and 14(C) show variations in weighting coefficients $\xi$ and $\eta$ depending upon the dot percents $d_M$ and $d_C$ of the respective inks. As shown in FIGS. 14(B) and 14(C), the values of the weighting coefficients $\xi_M(d_M)$, $\eta_M(d_M)$, $\xi_C(d_C)$, and $\eta_C(d_C)$ depend upon the dot percents $d_M$ and $d_C$ of the respective inks constituting the secondary color.

FIG. 14(D) shows a two-dimensional correction space defined by the weighting coefficients $\xi_M(d_M), \eta_M(d_M), \xi_C(d_C)$, and $\eta_C(d_C)$. The reflection coefficient $Sb(d_{C/M}, \lambda)$ with respect to the secondary target color (closed square) is obtained by summing up the respective products of the reference reflection coefficients with respect to the four reference colors (closed circles) and the volumes of the partial two-dimensional correction spaces, which are located at diagonal positions against the points of the respective reference colors (Equation (10)).

The reflection coefficients for the reference colors (closed circles) in FIG. 14(D) are measured in advance. The reflection coefficient with respect to a target color (closed square) of an arbitrary dot percent $d_{C/M}$ can thus be determined according to Equation (10) by previously determining variations in weighting coefficients $\xi_M(d_M), \eta_M(d_M), \xi_C(d_C)$, and $\eta_C(d_C)$ (FIGS. 14(B) and 14(C)) according to Equations (19) through (21) discussed above. The specular reflection coefficient Ss can be determined in a similar way. Substitution of these reflection coefficients Sb and Ss into Equation (4) enables determination of the illuminance spectrum I for the secondary color and calculation of color data X, Y, and Z thereof.

Figure 15:
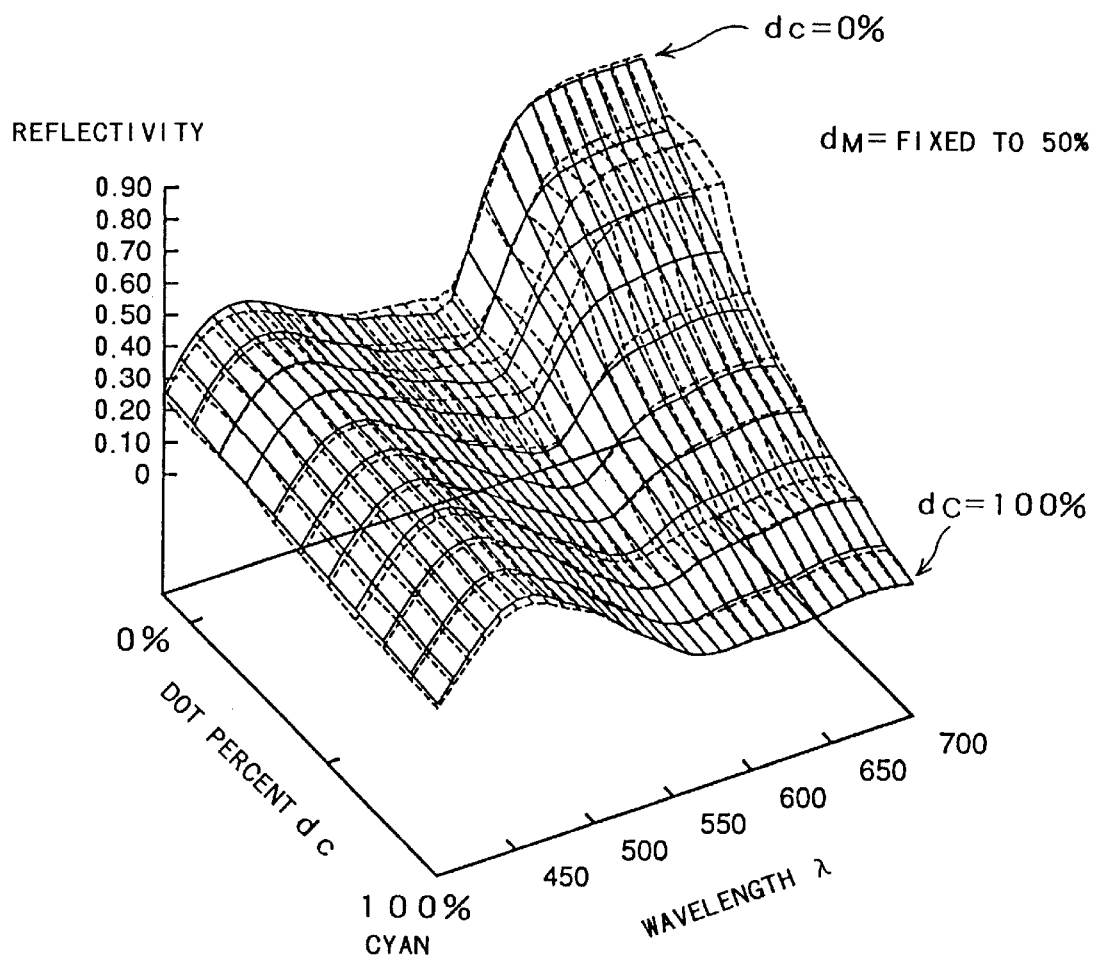
FIG. 15 is a graph showing comparison between the measured values of the diffuse reflection component Sb(d, λ)cos θ for the secondary color and the results of simulation according to Equation (10)

FIG. 15 is a graph showing comparison between the measured values of the diffuse reflection component $Sb(d, \lambda)\cos\theta$ regarding the secondary color (shown by the solid lines) and the results of simulation according to Equation (10) (shown by the broken lines). FIG. 15 shows the results regarding the secondary color, in which the dot percent $d_M$ of magenta is fixed to 50% while the dot percent $d_c$ of cyan varies from 0% to 100% by every 10%. The solid lines well agree with the broken lines. As for the specular reflection component, the measured values also well agree with the result of simulation.

Figure 16A:
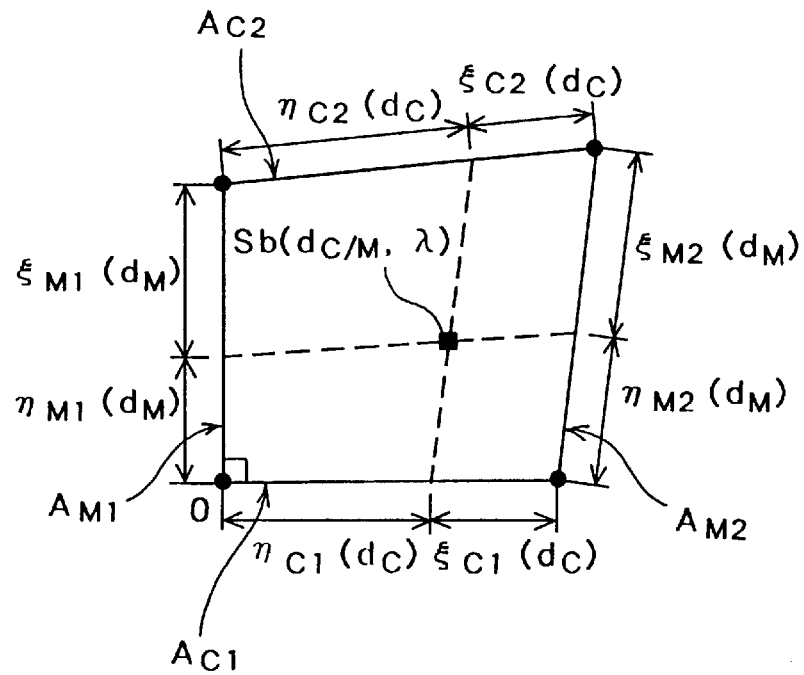
FIGS. 16(A) and 16(B) show a method of determining the reflection coefficients for the secondary color with the higher precision.
Figure 16B:
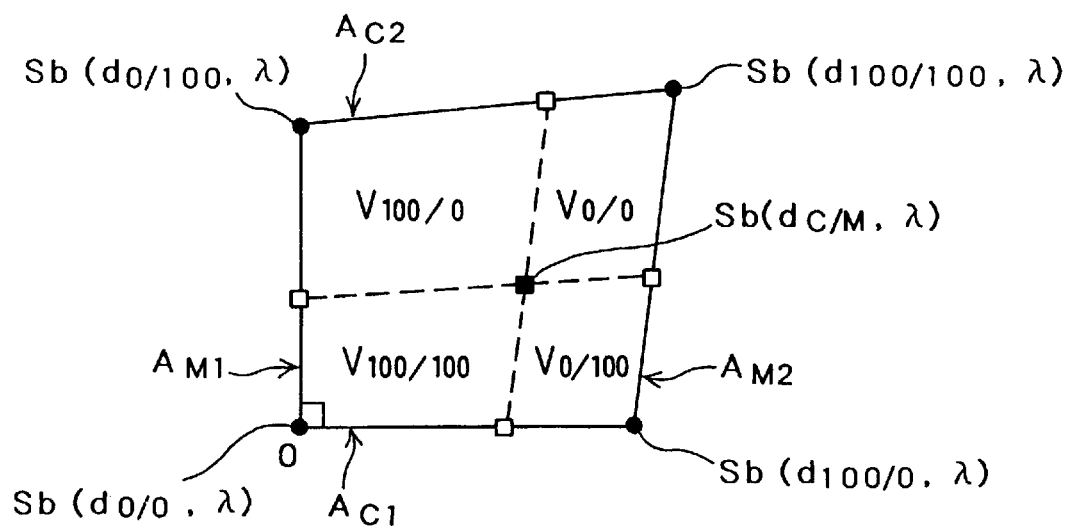

F. Method of Determining Reflection Coefficients for Secondary Color with Higher Precision FIGS. 16(A) and 16(B) show a method of determining the reflection coefficients for the secondary color with the higher precision. In order to determine the reflection coefficient for the target secondary color (closed square) more precisely, the weighting coefficients $\xi$ and $\eta$ are determined independently on the four sides $A_{C1}, A_{C2}, A_{M1}$, and $A_{M2}$ constituting the periphery of the two-dimensional color space including the target color, according to Equations (19) through (21) discussed above. Variations as shown in FIG. 14(B) or FIG. 14(C) are then obtained for the four sets of the weighting coefficients $\xi$ and $\eta$ with respect to the four sides $A_{C1}, A_{C2}, A_{M1}$, and $A_{M2}$.

FIGS. 16(A) and 16(B) show a corrected coordinate system defined by the four sets of weighting coefficients thus obtained. The length of each of the four sides $A_{C1}, A_{C2}, A_{M1}$, and $A_{M2}$ is equal to the sum of each set of the weighting coefficients $(\xi + \eta)$ The side $A_{C1}$ where magenta is fixed to 0% (cyan axis) is perpendicular to the side $A_{M1}$ where cyan is fixed to 0% (magenta axis). The shape of the rectangle defined by these four sides $A_{C1}, A_{C2}, A_{M1}$, and $A_{M2}$ is accordingly determined unequivocally. The correction space including the coordinate axes that are not parallel to each other nor perpendicular to each other as shown in FIG. 16(A) is referred to as the 'distorted correction space'.

Equation (10) is applicable to determine the reflection coefficient for the target color (closed square) in the distorted correction space. The 'volume V' of the partial two-dimensional correction space that is located at a diagonal position against each reference color (closed circle) is defined as the area of a distorted partial two-dimensional correction space as shown in FIG. 16(B). The correction space of FIG. 16(B) is identical with that of FIG. 16(A). As clearly understood from FIGS. 16(A) and 16(B), a reference point (open square) dividing each side into the lengths of the weighting coefficients $\xi$ and $\eta$ is virtually set in the distorted correction space. The distorted two-dimensional correction space is divided by two straight lines, which respectively connect the reference points (open squares) of the facing sides, into four partial two-dimensional correction spaces.

Determination of the volumes V as shown in FIG. 16(B), which are used in Equation (10), enables determination of the reflection coefficients for the secondary target color with higher precision.

G. Method of Determining Reflection Coefficients for Tertiary and Higher-order Colors The diffuse reflection coefficient at an arbitrary dot percent of the tertiary color is given by Equation (11) discussed above. The specular reflection coefficient can be given in a similar manner. The method of determining the reflection coefficients for the tertiary color according to Equation (11) is similar to the method of determining the reflection coefficients for the secondary color, and is thereby not specifically described here.

In general, the reflection coefficients for the n-order color, where n is an integer of not less than 2, are determined according to Equations (12) and (13) discussed above. It is required to previously determine the reflection coefficients for the $2^n$ reference colors and the weighting coefficients $\xi_k(d_k)$ and $\eta_k(d_k)$ for each ink of the n-order color where the subscript k represents each kind of ink.

Figure 17:
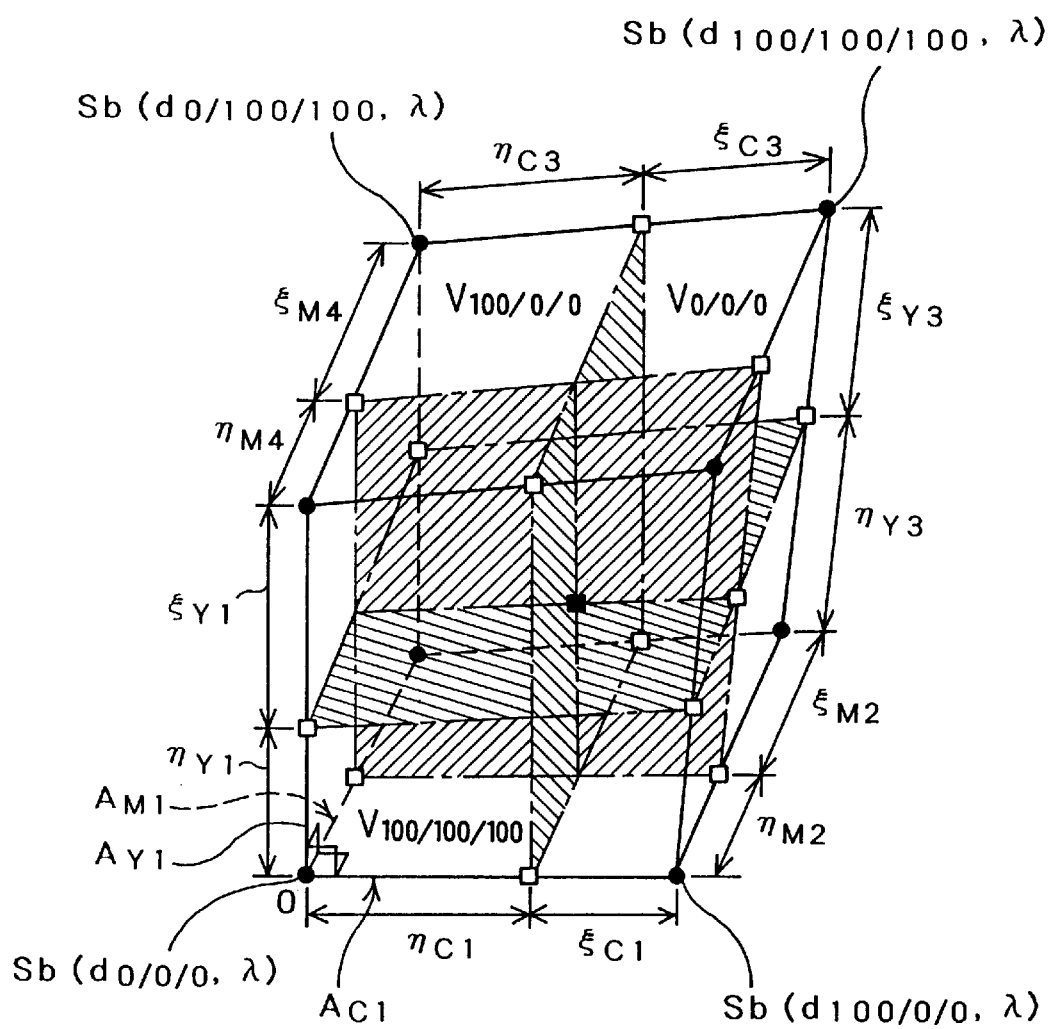
FIG. 17 shows a method of determining the reflection coefficients for the tertiary color with the higher precision.

FIG. 17 shows a method of determining the reflection coefficients for the tertiary color with a higher precision. In order to determine the reflection coefficient for the target tertiary color (closed square) more precisely, the weighting coefficients $\xi$ and $\eta$ are determined independently on the twelve sides constituting the periphery of the three-dimensional color space including the target color, according to Equations (19) through (21) discussed above.

FIG. 17 shows a corrected coordinate system defined by the twelve sets of weighting coefficients thus obtained. The length of each of the twelve sides is equal to the sum of each set of the weighting coefficients ($\xi+\eta$). There are three side perpendicular to one another: the side $A_{C1}$ where magenta is fixed to 0% (cyan axis), the side $A_{M1}$ where cyan is fixed to 0% (magenta axis), and the side $A_{Y1}$ where yellow is fixed to 0%. The shape of the distorted three-dimensional correction space defined by these twelve sides is accordingly determined unequivocally.

The above stated Equation (11) is applicable to determine the reflection coefficient for the target color (closed square) in the distorted three-dimensional correction space. The volume V of the partial three-dimensional correction space that is located at a diagonal position against each reference color (closed circle) is defined as the volume of a distorted partial three-dimensional correction space as shown in FIG. 17. The distorted partial three-dimensional correction space is specified in the following manner. A reference point (open square) dividing each side into $\xi$ and $\eta$ is virtually positioned on each side in the distorted three-dimensional correction space. The distorted three-dimensional correction space is divided by three planes, which respectively run through the reference points (open squares) of the facing four sides, into eight partial three-dimensional correction spaces.

Determination of the volume V according to Equation (11) as shown in FIG. 17 enables determination of the reflection coefficients for the tertiary target color with higher precision.

In general, in order to determine the reflection coefficients for the n-order color, the weighting coefficients $\xi$ and $\eta$ are determined independently on the $n \times 2^{(n-1)}$ sides constituting the periphery of the n-dimensional color space including the target color, according to Equations (19) through (21) discussed above. A distorted n-dimensional correction space is then constructed by these weighting coefficients $\xi$ and $\eta$. Equation (12) is applicable to determine the reflection coefficients for the target color in the distorted n-dimensional correction space. The distorted partial n-dimensional correction space is specified in the following manner. A reference point dividing each side into the lengths of the weighting coefficients $\xi$ and $\eta$ is virtually set on each side in the distorted n-dimensional correction space. The distorted n-dimensional correction space is then divided by n pieces of (n−1)-dimensional spaces, which respectively run through the reference points of the facing sides, into $2^n$ partial n-dimensional correction spaces.

H. Simulation of Color Print

Referring back to the flowchart of FIG. 5, steps S6 and S7 show a process of reproducing a print with an output device, based on the reference reflection coefficients Sb and Ss and the weighting coefficients $\xi$ and $\eta$ obtained by the processing of steps S1 through S4. At step S6, a rendering operation by computer graphics is carried out to generate color data for reproducing the colors of a color print.

Figure 18:
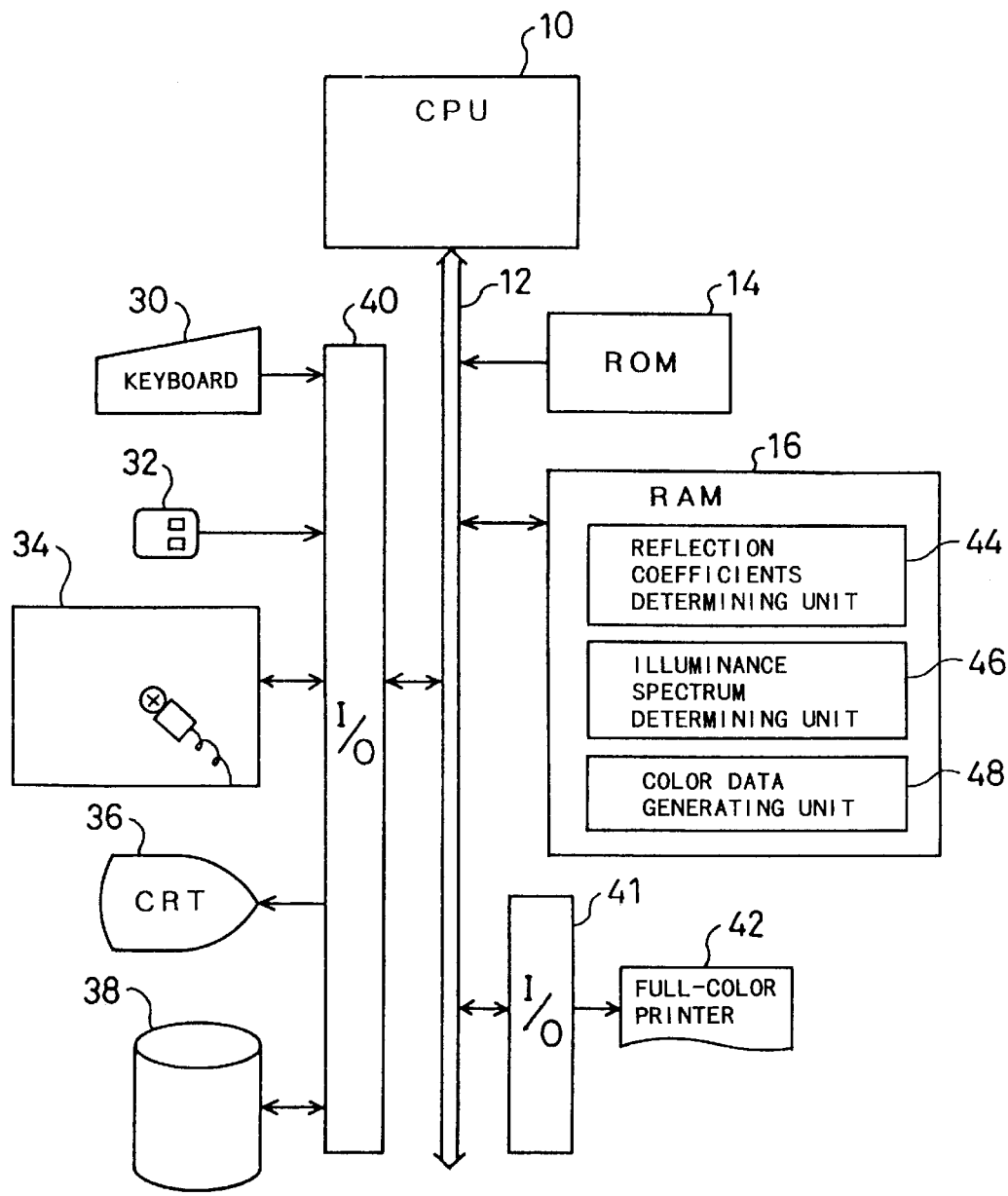
FIG. 18 is a block diagram illustrating a computer system for reproducing colors of a print arranged in a three-dimensional space, as an embodiment of the present invention.

FIG. 18 is a block diagram illustrating a computer system for reproducing a color print arranged in a three-dimensional space, as an embodiment of the present invention. The computer system includes CPU 10 and a bus line 12. ROM 14 and RAM 16 are connected to the bus line 12. A keyboard 30, a mouse 32, a digitizer 34, a color CRT 36, a magnetic disk 38, and a full-color printer 42 are also connected to the bus line 12 via input/output interfaces 40 and 41.

The RAM 16 stores applications programs that implement functions of: a reflection coefficients determining unit 44, a illuminance spectrum determining unit 46, and a color data generating unit 48. The reflection coefficients determining unit 44 determines reflection coefficients Sb and Ss according to Equations (8) through (13) discussed above. The illuminance spectrum determining unit 46 determines the illuminance spectrum $I(d,\theta,\rho,\lambda)$ according to Equation (4) given above. The color data generating unit 48 obtains three stimulus values X(d), Y(d), and Z(d) according to Equations (5a)–(5c) given above, and converts the stimulus values to color data corresponding to the colorimetric system in the output device. The CPU 10 executes the applications programs stored in the RAM 16 to implement the functions of the respective units. The computer system also stores an applications program for carrying out a rendering operation to reproduce a color print arranged in a three-dimensional space on a color display.

Figure 19:
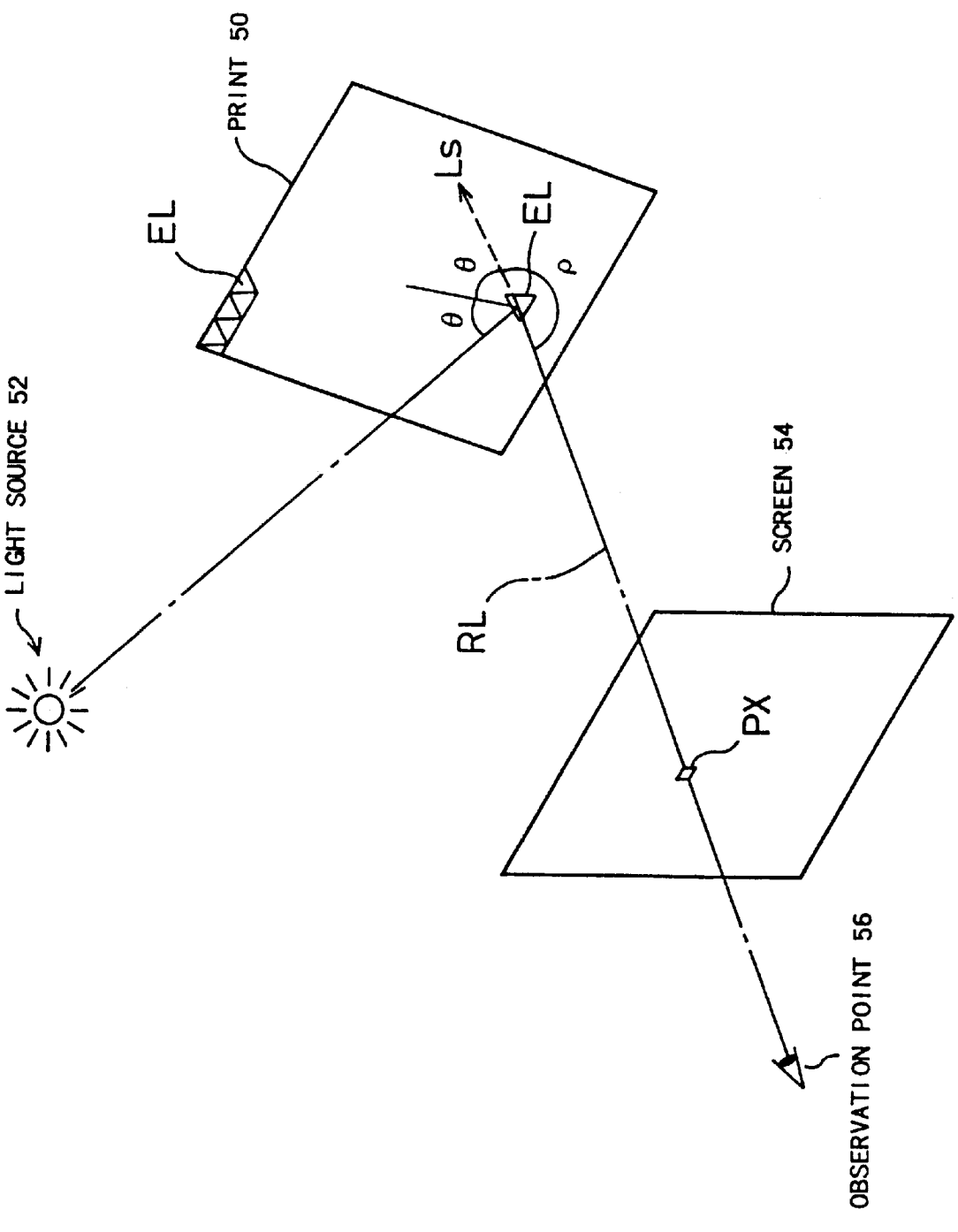
FIG. 19 shows a three-dimensional arrangement for reproducing the colors of a print by a ray tracing method.

FIG. 19 shows a three-dimensional arrangement of a print 50, a light source 52, a screen 54 on the CRT, and an observation point, which are used in a ray tracing method. The ray tracing method is a known rendering technique in three-dimensional computer graphics. The ray tracing method traces a line of sight RL, which passes through each pixel PX on the screen 54 and the observation point 56, inversely from the observation point 56 to the light source, thereby determining color data (RGB data) at each pixel PX on the screen 54. The print 50 is divided into a plurality of small polygons EL in advance. Each small polygon EL corresponds to a target point in the claimed invention. Although each small polygon EL is a plane, the whole print 50 may be modeled to have a three-dimensional curvature. The angle of incidence $\theta$ and the angle of deviation $\rho$ are defined in a specific small polygon EL existing at the intersection of the line of sight RL and the print 50 as shown in FIG. 19.

In the process of ray tracing, the reflection coefficients determining unit 44 determines the reflection coefficients Sb(d,λ) and Ss(d,λ) according to Equations (8) through (13) discussed above. The illuminance spectrum determining unit 46 determines the illuminance spectrum I(d,θ,ρ,λ) according to Equation (4) given above. The color data generating unit 48 integrates the illuminance spectrum I(d,θ,ρ,λ) thus obtained according to Equations (5a)–(5c) given above to determine three stimulus values X, Y, and Z.

At step S7 in the flowchart of FIG. 5, the color data generating unit 48 converts the three stimulus values thus obtained to RGB data and allocate the RGB data to the pixels on the color CRT 36. In accordance with a concrete procedure, RGB data are stored at each pixel position in a frame memory. A color print is displayed on the color CRT 36 according to the RGB data in the frame memory. Conversion of the XYZ colorimetric system to the RGB colorimetric system depends upon the characteristics of the output device. Using conversion equations corresponding to the output device thereby enables the accurate color reproduction in the expressible range of colors in the output device.

As discussed above, the above embodiment can precisely determine the reflection coefficients Sb and Ss for an N-order target color (N is an integer of not less than 2) directly from reference reflection coefficient values for $2^n$ reference colors. These reflection coefficients Sb and Ss can be used to determine color data regarding the N-order color (for example, XYZ or RGB data). This accordingly enables a print of the N-order color having an arbitrary dot percent to be reproduced with high precision on a display.

The present invention is not restricted to the above embodiment or its applications, but there may be many modifications, changes, and alterations without departing from the scope or spirit of the main characteristics of the present invention. Some examples of possible modification are given below.

As for the black ink, the simultaneous equations given by Equations (19) and (20) may have a linear dependence with each other, and therefore the weighting coefficients ξ and η are not obtained according to Equation (21). The linear dependence of the simultaneous equations given by Equations (19) and (20) implies that the diffuse reflection components for the respective color chips of the primary gradation have similar shapes; that is, the eleven curves in FIG. 11 have similar shapes. In this case, an effective dot percent $d_{net}$ calculated according to the well-known Marley-Davis's Equation may be applied for the weighting coefficient $\eta_k$, while the other weighting function $\xi_k$ is given as $(1-d_{net})$.

In the above embodiment, the weighting coefficients $\xi_k$ and $\eta_k$ are calculated for each ink. Instead, a set of the weighting coefficients $\xi_k$ and $\eta_k$ obtained for a certain kind of ink may be applied for the other inks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of simulating a color print of an N-order color, where N is an integer of at least 2, arranged in a three-dimensional space by rendering said color print and thereby reproducing said color print with an output device, said method using an illuminance spectrum $I(d_{1-N},\theta,\rho,\lambda)$ of a reflected light beam, which is observed at a predetermined observation point when a target point having a target N-order color on said color print is irradiated with light having a predetermined luminance spectrum +(k), said illuminance spectrum $I(d_{1-N},\theta,\rho,\lambda)$ being given by the following Equation:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda)$$

wherein $d_{1-N}$ denotes a dot percent of each of N different color inks at said target point, λ denotes a wavelength of light, $Sb(d_{1-N},\lambda)$ and $Ss(d_{1-N},\lambda)$ respectively represent a first reflection coefficient and a second reflection coefficient for the N-order color, θ denotes an angle of reflection, fb(θ) denotes a θ-dependent characteristic, ρ denotes an angle of deviation of an observing direction from a reflecting direction of the reflected light beam, fs(ρ) denotes a ρ-dependent characteristic, and Ie(λ) represents an illuminance spectrum of ambient light observed at said observation point; said method comprising the steps of:

(a) determining a first reference value of said first reflection coefficient Sb and a second reference value of said second reflection coefficient Ss as a first reference reflection coefficient and a second reference reflection coefficient with respect to each of $2^N$ reference colors, said $2^N$ reference colors being located at both ends of $N \times 2^{(N-1)}$ sides that constitute an N-dimensional color space including said target N-order color, said first and second reference reflection coefficients for said each of $2^N$ reference colors being used to determine said illuminance spectrum $I(d_{1-N},\theta,\rho,\lambda)$ of said each of $2^N$ reference colors according to said Equation;

(b) specifying, with respect to each side of said N-dimensional color space, two weighting coefficients for two reference colors located at both ends of said each side, said two weighting coefficients being usable in determining a color on said each side by interpolating said two reference colors at the both ends;

(c) constructing an N-dimensional correction space corresponding to said N-dimensional color space, each side of said N-dimensional correction space having a length equal to a sum of said two weighting coefficients for a corresponding side of said N-dimensional color space; allocating said two reference colors at the both ends of said each side of said N-dimensional color space to both ends of a corresponding side of said N-dimensional correction space; and dividing said N-dimensional correction space by N pieces of (N−1)-order spaces into $2^N$ partial N-dimensional correction spaces, said N pieces of (N−1)-order spaces running through said target N-order color;

(d) multiplying said first reference reflection coefficient with respect to each of said $2^N$ reference colors by a volume of a partial N-dimensional correction space which is at a diagonal position against a point of each reference color in said N-dimensional correction space, and summing up the results of multiplication for said $2^N$ reference colors, to thereby determine said first reflection coefficient Sb for said target point;

(e) multiplying said second reference reflection coefficient with respect to each of said $2^N$ reference colors by a volume of a partial N-dimensional correction space which is at a diagonal position against a point of each reference color in said N-dimensional correction space, and summing up the results of multiplication for said $2^N$ reference colors, to thereby determine said second reflection coefficient Ss for said target N-order color;

(f) determining said illuminance spectrum I of the reflected light beam according to said Equation with said first reflection coefficient Sb and said second reflection coefficient Ss determined in said steps (d) and (e); and (g) obtaining color data representing said target point in a calorimetric system suitable for said output device based on said illuminance spectrum I of the reflected light beam.

2. A method in accordance with claim 1, wherein said N-dimensional correction space has N pieces of axes starting from an origin of said N-dimensional correction space, said N pieces of axes being perpendicular to each other, and wherein each of said N pieces of (N-1)-order spaces is perpendicular to one of said N pieces of axes.

3. A method in accordance with claim 1, wherein said characteristics $fb(\theta)$ and $fs(\rho)$ are given by:

$$fb(\theta) = \cos\theta$$

$$fs(\rho) = e^{-\chi\rho^2}$$

where $\chi$ is a constant.

4. An apparatus for simulating a color print of an N-order color, where N is an integer of at least 2, arranged in a three-dimensional space by rendering said color print and thereby reproducing said color print with an output device, said apparatus using an illuminance spectrum $I(d_{1-N},\theta,\rho,\lambda)$ of a reflected light beam, which is observed at a predetermined observation point when a target point having a target N-order color on said color print is irradiated with light having a predetermined luminance spectrum $\phi(\lambda)$, said illuminance spectrum $I(d_{1-N},\theta,\rho,\lambda)$ being given by the following Equation:

$$I(d_{1-N},\theta,\rho,\lambda) = \{Sb(d_{1-N},\lambda) \cdot fb(\theta) + Ss(d_{1-N},\lambda) \cdot fs(\rho)\} \cdot \phi(\lambda) + Ie(\lambda)$$

wherein $d_{1-N}$ denotes a dot percent of each of N different color inks at said target point, $\lambda$ denotes a wavelength of light, $Sb(d_{1-N},\lambda)$ and $Ss(d_{1-N},\lambda)$ respectively represent a first reflection coefficient and a second reflection coefficient for the N-order color, $\theta$ denotes an angle of reflection, $fb(\theta)$ denotes a $\theta$-dependent characteristic, p denotes an angle of deviation of an observing direction from a reflecting direction of the reflected light beam, $fs(\rho)$ denotes a $\rho$-dependent characteristic, and $Ie(\lambda)$ represents an illuminance spectrum of ambient light observed at said observation point; said apparatus comprising:

reference reflection coefficient determining means for determining a first reference value of said first reflection coefficient Sb and a second reference value of said second reflection coefficient Ss as a first reference reflection coefficient and a second reference reflection coefficient with respect to each of $2^N$ reference colors, said $2^N$ reference colors being located at both ends of $N \times 2^{(N-1)}$ sides that constitute an N-dimensional color space including said target N-order color, said first and second reference reflection coefficients for said each of $2^N$ reference colors being used to determine said illuminance spectrum $I(d_{1-N},\theta,\rho,\lambda)$ of said each of $2^N$ reference colors according to said Equation;

means for specifying, with respect to each side of said N-dimensional color space, two weighting coefficients for two reference colors located at both ends of said each side, said two weighting coefficients being usable in determining a color on said each side by interpolating said two reference colors at the both ends;

means for constructing an N-dimensional correction space corresponding to said N-dimensional color space, each side of said N-dimensional correction space having a length equal to a sum of said two weighting coefficients for a corresponding side of said N-dimensional color space; allocating said two reference colors at the both ends of said each side of said N-dimensional color space to both ends of a corresponding side of said N-dimensional correction space; and dividing said N-dimensional correction space by N pieces of (N-1)-order spaces into $2^N$ partial N-dimensional correction spaces, said N pieces of (N-1)-order spaces running through said target N-order color;

first reflection coefficient determining means for multiplying said first reference reflection coefficient with respect to each of said $2^N$ reference colors by a volume of a partial N-dimensional correction space which is at a diagonal position against a point of each reference color in said N-dimensional correction space, and summing up the results of multiplication for said $2^N$ reference colors, to thereby determine said first reflection coefficient Sb for said target point;

second reflection coefficient determining means for multiplying said second reference reflection coefficient with respect to each of said $2^N$ reference colors by a volume of a partial N-dimensional correction space which is at a diagonal position against a point of each reference color in said N-dimensional correction space, and summing up the results of multiplication for said $2^N$ reference colors, to thereby determine said second reflection coefficient Ss for said target N-order color;

illuminance spectrum determining means for determining said illuminance spectrum I of the reflected light beam according to said Equation with said first reflection coefficient Sb and said second reflection coefficient Ss determined by said first and second reflection coefficient determining means; and means for obtaining color data representing said target point in a colorimetric system suitable for said output device based on said illuminance spectrum I of the reflected light beam.

5. An apparatus in accordance with claim 4, wherein said N-dimensional correction space has N pieces of axes starting from an origin of said N-dimensional correction space, said N pieces of axes being perpendicular to each other, and wherein each of said N pieces of (N-1)-order spaces is perpendicular to one of said N pieces of axes.

6. An apparatus in accordance with claim 4, wherein said characteristics $fb(\theta)$ and $fs(\rho)$ are given by:

$$fb(\theta) = \cos\theta$$

$$fs(\rho) = e^{-\chi\rho^2}$$

where $\chi$ is a constant.

7. A computer program product for simulating a color print of an N-order color, where N is an integer of at least 2, arranged in a three-dimensional space by rendering said color print and thereby reproducing said color print with an output device, said computer program product comprising:

a computer readable storage medium; and a computer program code means stored on said computer readable storage medium, said computer program code means comprising:

first program code means using an illuminance spectrum $I(d_{1-N},\theta,\rho,\lambda)$ of a reflected light beam, which is observed at a predetermined observation point when a target point having a target N-order color on said color print is irradiated with light having a predetermined luminance spectrum $\phi(\lambda)$, said illuminance spectrum $I(d_{1-N},\theta,\rho,\lambda)$ being given by the following Equation:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda)$$

wherein $d_{1-N}$ denotes a dot percent of each of N different color inks at said target point, $\lambda$ denotes a wavelength of light, $Sb(d_{1-N},\lambda)$ and $Ss(d_{1-N},\lambda)$ respectively represent a first reflection coefficient and a second reflection coefficient for the N-order color, $\theta$ denotes an angle of reflection, $fb(\theta)$ denotes a $\theta$-dependent characteristic, p denotes an angle of deviation of an observing direction from a reflecting direction of the reflected light beam, $fs(\rho)$ denotes a $\rho$-dependent characteristic, and $Ie(\lambda)$ represents an illuminance spectrum of ambient light observed at said observation point, said first program code means causing a computer to determine a first reference value of said first reflection coefficient Sb and a second reference value of said second reflection coefficient Ss as a first reference reflection coefficient and a second reference reflection coefficient with respect to each of $2^N$ reference colors, said $2^N$ reference colors being located at both ends of $N\times 2^{(N-1)}$ sides that constitute an N-dimensional color space including said target N-order color, said first and second reference reflection coefficients for said each of $2^N$ reference colors being used to determine said illuminance spectrum $I(d_{1-N},\theta,\rho,\lambda)$ of said each of $2^N$ reference colors according to said Equation;

second program code means for causing the computer to specify, with respect to each side of said N-dimensional color space, two weighting coefficients for two reference colors located at both ends of said each side, said two weighting coefficients being usable in determining a color on said each side by interpolating said two reference colors at the both ends;

third program code means for causing the computer to construct an N-dimensional correction space corresponding to said N-dimensional color space, each side of said N-dimensional correction space having a length equal to a sum of said two weighting coefficients for a corresponding side of said N-dimensional color space; allocating said two reference colors at two both ends of said each side of said N-dimensional color space to both ends of a corresponding side of said N-dimensional correction space; and dividing said N-dimensional correction space by N pieces of (N−1)-order spaces into $2^N$ partial N-dimensional correction spaces, said N pieces of (N−1)-order spaces running through said target N-order color;

fourth program code means for causing the computer to multiply said first reference reflection coefficient with respect to each of said $2^N$ reference colors by a volume of a partial N-dimensional correction space which is at a diagonal position against a point of each reference color in said N-dimensional correction space, and to sum up the results of multiplication for said $2^N$ reference colors, to thereby determine said first reflection coefficient Sb for said target point;

fifth program code means for causing the computer to multiply said second reference reflection coefficient with respect to each of said $2^N$ reference colors by a volume of a partial N-dimensional correction space which is at a diagonal position against a point of each reference color in said N-dimensional correction space, and summing up the results of multiplication for said $2^N$ reference colors, to thereby determine said second reflection coefficient Ss for said target N-order color;

sixth program code means for causing the computer to determine said illuminance spectrum I of the reflected light beam according to said Equation of said first program code means with said first reflection coefficient Sb and said second reflection coefficient Ss determined by said fourth and fifth program code means; and seventh program code means for causing the computer to obtain color data representing said target point in a colorimetric system suitable for said output device based on said illuminance spectrum I of the reflected light beam.

* * * * *